US00RE48812E

(19) United States
(12) Reissued Patent
Dassanayake

(10) Patent Number: US RE48,812 E
(45) Date of Reissued Patent: Nov. 9, 2021

(54) LIGHT ASSEMBLY HAVING A CONTROL CIRCUIT IN A BASE

(71) Applicant: eLUMIGEN, LLC, Troy, MI (US)

(72) Inventor: Mahendra Dassanayake, Bloomfield Hills, MI (US)

(73) Assignee: eLUMIGEN, LLC, Troy, MI (US)

(21) Appl. No.: 16/508,571

(22) Filed: Jul. 11, 2019

Related U.S. Patent Documents

Reissue of:
(64) Patent No.: 9,702,535
Issued: Jul. 11, 2017
Appl. No.: 14/667,791
Filed: Mar. 25, 2015

U.S. Applications:
(63) Continuation of application No. 14/551,476, filed on Nov. 24, 2014, now Pat. No. 9,644,824, which is a
(Continued)

(51) Int. Cl.
*F21V 23/00* (2015.01)
*F21K 9/64* (2016.01)
(Continued)

(52) U.S. Cl.
CPC ..... *F21V 9/30* (2018.02); *F21K 9/232* (2016.08); *F21K 9/64* (2016.08); *F21V 3/00* (2013.01);
(Continued)

(58) Field of Classification Search
CPC .... F21V 23/003; F21V 23/004; F21V 23/006; F21V 23/009; F21V 29/70; F21V 29/74;
(Continued)

(56) References Cited

U.S. PATENT DOCUMENTS 4,727,289 A 2/1988 Uchida
5,132,875 A 7/1992 Plesinger
(Continued)

FOREIGN PATENT DOCUMENTS

CN 2444117 Y 8/2001
CN 2767821 Y 3/2006
(Continued)

OTHER PUBLICATIONS

First Office Action regarding Chinese Patent Application No. 201410559918X, issued Nov. 30, 2015.
(Continued)

*Primary Examiner* — James A Menefee
(74) *Attorney, Agent, or Firm* — Harness, Dickey & Pierce, P.L.C.

(57) ABSTRACT

A light assembly that includes a cover, a housing coupled to the cover, and a lamp base coupled to the cover. The light assembly also includes a first circuit board disposed within the housing. The first circuit board has a plurality of light sources thereon. A heat sink is thermally coupled to the light sources and is disposed within the housing. The heat sink includes openings therethrough. Each of the outer edges is in contact with the housing. The light assembly also includes an elongated control circuit board assembly electrically coupled to the light sources of the first circuit board and the lamp base. The control circuit board extends through the openings. The control circuit board has a plurality of electrical components thereon for controlling the light sources.

14 Claims, 21 Drawing Sheets

Related U.S. Application Data continuation of application No. 13/172,435, filed on Jun. 29, 2011, now abandoned, which is a continuation of application No. 12/817,807, filed on Jun. 17, 2010, now Pat. No. 8,186,852.

(60) Provisional application No. 61/265,149, filed on Nov. 30, 2009, provisional application No. 61/220,019, filed on Jun. 24, 2009.

(51) Int. Cl.

| | |
|---|---|
| ***F21K 9/232*** | (2016.01) |
| ***F21V 3/00*** | (2015.01) |
| ***F21V 13/08*** | (2006.01) |
| ***F21V 9/08*** | (2018.01) |
| ***F21V 29/75*** | (2015.01) |
| ***F21V 7/08*** | (2006.01) |
| ***F21V 29/70*** | (2015.01) |
| ***F21V 7/00*** | (2006.01) |
| ***F21V 7/22*** | (2018.01) |
| ***F21V 29/76*** | (2015.01) |
| ***F21V 9/30*** | (2018.01) |
| ***F21V 7/28*** | (2018.01) |
| ***F21V 9/35*** | (2018.01) |
| ***F21V 3/02*** | (2006.01) |
| ***F21V 7/06*** | (2006.01) |
| ***F21V 9/06*** | (2018.01) |
| *F21Y 103/33* | (2016.01) |
| *F21Y 115/10* | (2016.01) |

(52) U.S. Cl.

CPC ..... *F21V 3/02* (2013.01); *F21V 7/06* (2013.01); *F21V 7/08* (2013.01); *F21V 7/28* (2018.02); *F21V 9/06* (2013.01); *F21V 9/08* (2013.01); *F21V 9/35* (2018.02); *F21V 13/08* (2013.01); *F21V 23/009* (2013.01); *F21V 29/70* (2015.01); *F21V 29/75* (2015.01); *F21V 7/0025* (2013.01); *F21V 29/767* (2015.01); *F21Y 2103/33* (2016.08); *F21Y 2115/10* (2016.08)

(58) Field of Classification Search

CPC ..... F21V 29/767; F21V 29/777; F21V 29/83; F21K 9/235; F21K 9/237; F21K 9/238

See application file for complete search history.

(56) References Cited

U.S. PATENT DOCUMENTS

| | | | | |
|---|---|---|---|---|
| 5,654,587 | A | 8/1997 | Schneider et al. | |
| 6,019,493 | A | 2/2000 | Kuo et al. | |
| 6,045,240 | A | 4/2000 | Hochstein | |
| 6,149,283 | A | 11/2000 | Conway et al. | |
| 6,538,892 | B2 | 3/2003 | Smalc | |
| 6,659,632 | B2 | 12/2003 | Chen | |
| 6,688,753 | B2 | 2/2004 | Calon et al. | |
| 6,767,111 | B1 | 7/2004 | Lai | |
| D494,687 | S | 8/2004 | Matsui et al. | |
| 6,820,998 | B2 | 11/2004 | Chen | |
| 6,827,475 | B2 | 12/2004 | Vetorino et al. | |
| 6,840,654 | B2 | 1/2005 | Guerrieri et al. | |
| 6,864,513 | B2 | 3/2005 | Lin et al. | |
| 6,948,829 | B2 | 9/2005 | Verdes et al. | |
| 6,965,205 | B2 | 11/2005 | Plepgras et al. | |
| 6,982,518 | B2 | 1/2006 | Chou et al. | |
| 7,038,399 | B2 | 5/2006 | Lys et al. | |
| 7,068,512 | B2 | 6/2006 | Lee et al. | |
| 7,125,160 | B2 | 10/2006 | Wong et al. | |
| D531,740 | S | 11/2006 | Maxik | |
| D532,532 | S | 11/2006 | Maxik | |
| 7,134,769 | B2 * | 11/2006 | Rohlfing | B63B 45/04 362/294 |
| 7,160,012 | B2 | 1/2007 | Hilscher et al. | |
| 7,161,311 | B2 | 1/2007 | Mueller et al. | |
| 7,181,378 | B2 | 2/2007 | Benitez et al. | |
| D538,950 | S | 3/2007 | Maxik | |
| D538,952 | S | 3/2007 | Maxik et al. | |
| 7,217,009 | B2 | 5/2007 | Klose | |
| 7,226,189 | B2 | 6/2007 | Lee et al. | |
| 7,246,919 | B2 | 7/2007 | Porchia et al. | |
| 7,253,447 | B2 | 8/2007 | Oishi et al. | |
| D553,266 | S | 10/2007 | Maxik | |
| 7,319,293 | B2 | 1/2008 | Maxik | |
| 7,344,279 | B2 | 3/2008 | Mueller et al. | |
| D566,309 | S | 4/2008 | Kornfeld et al. | |
| D566,323 | S | 4/2008 | Piepgras et al. | |
| 7,350,936 | B2 | 4/2008 | Ducharme et al. | |
| 7,352,138 | B2 | 4/2008 | Lys et al. | |
| 7,358,679 | B2 | 4/2008 | Lys et al. | |
| 7,367,692 | B2 | 5/2008 | Maxik | |
| 7,375,476 | B2 | 5/2008 | Walter et al. | |
| 7,396,142 | B2 | 7/2008 | Laizure, Jr. et al. | |
| 7,401,948 | B2 | 7/2008 | Chinniah et al. | |
| 7,445,340 | B2 | 11/2008 | Conner et al. | |
| D584,838 | S | 1/2009 | To et al. | |
| 7,482,632 | B2 | 1/2009 | Lu et al. | |
| 7,497,596 | B2 | 3/2009 | Ge | |
| 7,520,634 | B2 | 4/2009 | Ducharme et al. | |
| 7,521,875 | B2 | 4/2009 | Maxik | |
| 7,524,089 | B2 | 4/2009 | Park | |
| 7,527,397 | B2 | 5/2009 | Li | |
| 7,540,616 | B2 | 6/2009 | Conner | |
| 7,547,894 | B2 | 6/2009 | Agrawal et al. | |
| 7,604,378 | B2 | 10/2009 | Wolf et al. | |
| 7,607,802 | B2 | 10/2009 | Kang et al. | |
| D604,434 | S | 11/2009 | Wada et al. | |
| 7,708,452 | B2 * | 5/2010 | Maxik | H05K 1/189 174/254 |
| 7,738,235 | B2 | 6/2010 | Gloisten et al. | |
| 7,800,119 | B2 | 9/2010 | He et al. | |
| 7,802,903 | B1 | 9/2010 | Wray | |
| 7,841,741 | B2 | 11/2010 | Chan et al. | |
| 7,883,226 | B2 | 2/2011 | Li | |
| 7,905,639 | B2 | 3/2011 | Luo et al. | |
| 7,923,907 | B2 | 4/2011 | Tessnow et al. | |
| 7,948,183 | B2 | 5/2011 | Liang | |
| 7,972,040 | B2 | 7/2011 | Li et al. | |
| 7,976,182 | B2 * | 7/2011 | Ribarich | F21K 9/238 362/221 |
| 8,004,172 | B2 | 8/2011 | Hussell et al. | |
| 8,083,379 | B2 | 12/2011 | Schulz et al. | |
| 8,186,852 | B2 | 5/2012 | Dassanayake et al. | |
| 8,274,241 | B2 * | 9/2012 | Guest | H05B 33/0803 313/46 |
| 8,292,468 | B2 * | 10/2012 | Narendran | F21K 9/135 313/317 |
| 8,653,723 | B2 * | 2/2014 | Cao | F21V 3/00 313/45 |
| 8,760,042 | B2 * | 6/2014 | Sakai | F21K 9/1355 313/324 |
| 2003/0021117 | A1 | 1/2003 | Chan | |
| 2005/0094401 | A1 | 5/2005 | Magarill | |
| 2005/0173675 | A1 | 8/2005 | Schmidt et al. | |
| 2006/0043546 | A1 * | 3/2006 | Kraus | F21V 7/22 257/676 |
| 2006/0098440 | A1 | 5/2006 | Allen | |
| 2006/0198147 | A1 | 9/2006 | Ge | |
| 2006/0238136 | A1 | 10/2006 | Johnson, III et al. | |
| 2006/0262544 | A1 | 11/2006 | Piepgras et al. | |
| 2007/0139938 | A1 | 6/2007 | Petroski et al. | |
| 2007/0165408 | A1 | 7/2007 | Li | |
| 2007/0285921 | A1 | 12/2007 | Zulim et al. | |
| 2008/0013334 | A1 | 1/2008 | Lu et al. | |
| 2008/0093998 | A1 | 4/2008 | Dennery et al. | |
| 2008/0106893 | A1 | 5/2008 | Johnson et al. | |
| 2008/0232119 | A1 | 9/2008 | Ribarich | |
| 2008/0295522 | A1 | 12/2008 | Hubbell et al. | |
| 2008/0310158 | A1 | 12/2008 | Harbers et al. | |

(56) References Cited

U.S. PATENT DOCUMENTS

| | | | | |
|---|---|---|---|---|
| 2009/0001399 | A1 | 1/2009 | Diana et al. | |
| 2009/0059559 | A1 | 3/2009 | Pabst et al. | |
| 2009/0230834 | A1* | 9/2009 | Liu | F21V 23/02 313/12 |
| 2009/0296387 | A1 | 12/2009 | Reisenauer et al. | |
| 2009/0302237 | A1 | 12/2009 | Bortz et al. | |
| 2010/0010701 | A1 | 1/2010 | Gartner | |
| 2010/0020538 | A1 | 1/2010 | Schulz et al. | |
| 2010/0026157 | A1* | 2/2010 | Tanaka | F21K 9/1355 313/45 |
| 2010/0097811 | A1* | 4/2010 | Betsuda | F21K 9/135 362/362 |
| 2010/0103666 | A1 | 4/2010 | Chang et al. | |
| 2010/0103669 | A1 | 4/2010 | Yang et al. | |
| 2010/0103671 | A1 | 4/2010 | Zheng | |
| 2010/0110683 | A1 | 5/2010 | Fang et al. | |
| 2010/0110687 | A1 | 5/2010 | Zheng | |
| 2010/0118537 | A1 | 5/2010 | Shin | |
| 2010/0135012 | A1 | 6/2010 | Lee | |
| 2010/0207502 | A1* | 8/2010 | Cao | F21K 9/135 313/46 |
| 2010/0259935 | A1 | 10/2010 | Scordino et al. | |
| 2011/0075412 | A1 | 3/2011 | Wu et al. | |
| 2011/0090669 | A1* | 4/2011 | Sun | F21V 29/717 362/84 |
| 2011/0103080 | A1* | 5/2011 | Kalhoff | F21V 29/713 362/382 |
| 2011/0298371 | A1* | 12/2011 | Brandes | F21K 9/23 315/32 |

FOREIGN PATENT DOCUMENTS

| | | | | |
|---|---|---|---|---|
| CN | 2886314 | Y | 4/2007 | |
| DE | 1566447 | A1 | 1/1970 | |
| DE | 10344547 | A1 | 8/2005 | |
| EP | 1411290 | A1 | 4/2004 | |
| FR | 984607 | A | 7/1951 | |
| JP | 2003031005 | A | 1/2003 | |
| JP | 2006156187 | A | 6/2006 | |
| WO | WO-20040100213 | A2 | 11/2004 | |
| WO | WO-2007067513 | A2 | 6/2007 | |
| WO | WO-2009063655 | A1 | 5/2009 | |
| WO | WO 2009/153031 | A1 * | 12/2009 | F21K 7/00 |

OTHER PUBLICATIONS

Second Office Action regarding Chinese Patent Application No. 201410559918X, dated Jul. 22, 2016.

* cited by examiner

LIGHT ASSEMBLY HAVING A CONTROL CIRCUIT IN A BASE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 14/551,476 filed Nov. 24, 2014 which is a continuation of U.S. Ser. No. 13/172,435 filed on Jun. 29, 2011 (abandoned) which is a continuation of U.S. Pat. No. 8,186,852 issued on May 29, 2012, which claims the benefit of U.S. Provisional Application Nos. 61/220,019, filed on Jun. 24, 2009 and 61/265,149, filed Nov. 30, 2009. The entire disclosures of each of the above applications are incorporated herein by reference.

TECHNICAL FIELD

The present disclosure relates generally to lighting using solid state light sources such as light-emitting diodes or lasers and, more specifically, to lighting devices for various applications that use conic sections and various structural relationships to provide an energy-efficient long-lasting life source.

BACKGROUND

This section provides background information related to the present disclosure which is not necessarily prior art.

Providing alternative light sources is an important goal to reduce energy consumption. Alternatives to incandescent bulbs include compact fluorescent bulbs and light-emitting diode (LED) light bulbs. The compact fluorescent light bulbs use significantly less power for illumination. However, the materials used in compact fluorescent bulbs are not environmentally friendly.

Various configurations are known for light-emitting diode lights. Light-emitting diode lights last longer and have less environmental impact than compact fluorescent bulbs. Light-emitting diode lights use less power than compact fluorescent bulbs. However, many compact fluorescent bulbs and light-emitting diode lights do not have the same light spectrum as incandescent bulbs. They are also relatively expensive. In order to achieve maximum life from a light-emitting diode, heat must be removed from around the light-emitting diode. In many known configurations, light-emitting diode lights are subject to premature failure due to heat and light output deterrents with increased temperature.

SUMMARY

This section provides a general summary of the disclosure, and is not a comprehensive disclosure of its full scope or all of its features.

The present disclosure provides a lighting assembly that is used for generating light and providing a long-lasting and thus cost-effective unit.

In one aspect of the invention, a lighting assembly includes a base and a housing coupled to the base. The housing has a hyperboloidal portion. The light assembly includes a cover coupled to the housing. The cover includes a first ellipsoidal portion or spherical portion. The cover includes a cover center point. The light assembly includes a circuit board disposed within the housing having a plurality of light sources mounted thereon.

In another aspect of the disclosure, a light assembly includes an enclosure having a first portion comprising a first ellipsoidal or spherical portion having a center point therein, a second ellipsoidal portion adjacent to the first portion and a hyperboloidal portion adjacent to the intermediate ellipsoidal portion. The light assembly also includes a circuit board disposed within the enclosure adjacent to the hyperboloidal portion having a plurality of light source mounted thereon.

In another aspect of the disclosure, a light assembly having an axis of symmetry includes an enclosure comprising at least a base and a cover coupled to the base. The light assembly also includes a plurality of light sources disposed on a circuit board within the enclosure in a first ring having a center point aligned with the axis of symmetry. The light assembly also includes a reflector that has a first focal point within the cover and a plurality of second focal points disposed in a second ring coincident with the first ring.

In another aspect of the disclosure, a method of distributing light includes generating light from light-emitting diodes (LEDs) disposed in a first ring on a circuit board, transmitting high-angle light from the LEDs directly through a cover, reflecting low-angle light from the LEDs at a reflector, said reflector having an offset ellipsoidal shape having a common first focal point and a second ring of second focal points coincident with the first ring, and directing the low-angle light to the first focal point from the reflector.

In another aspect of the disclosure, a light assembly includes a cover and a housing coupled to the cover. The housing has a hyperboloidal-shaped portion. A first circuit board is disposed within the housing therein. The first circuit board has a plurality of light sources thereon. A heat sink is thermally coupled to the light sources. The heat sink includes a plurality of spaced-apart layers having outer edges. Each of the outer edges is in contact with the housing.

In another aspect of the disclosure, a light assembly includes an enclosure, a circuit board having a plurality of light sources disposed within the enclosure, and a plurality of light redirection elements associated with a respective one of the plurality of light sources. Each of the light redirection elements directs light toward a common point within the enclosure.

In another aspect of the disclosure, a light assembly includes a cover, a housing coupled to the cover, and a lamp base coupled to the cover. The light assembly also includes a first circuit board disposed within the housing. The first circuit board has a plurality of light sources thereon. A heat sink is thermally coupled to the light sources. The heat sink includes a plurality of spaced-apart layers having outer edges and openings therethrough. Each of the outer edges is in contact with the housing. The light assembly also includes an elongated control circuit board assembly electrically coupled to the light sources of the first circuit board and the lamp base. The control circuit board extends through the openings. The control circuit board has a plurality of electrical components thereon for controlling the light sources.

In another aspect of the disclosure, a light assembly includes an elongated housing, a reflective parabolic cylindrical surface within the elongated housing having a focal line and an elongated cover coupled to the elongated housing. The light assembly also includes a plurality of light sources spaced apart longitudinally and emitting light toward the parabolic cylindrical surface. The parabolic cylindrical surface reflects light from the light sources out of the housing through the cover.

In another aspect of the disclosure, a light assembly includes a base, a housing extending from the base having a partial paraboloidal cross-sectional surface, a light-shifting element disposed within the housing, and a plurality of light sources coupled to the housing. The light sources generate light. The light assembly also includes an angular portion reflecting light from the light sources toward the parabolic cross-sectional surface so that the light reflected from the parabolic surface is directed toward the light-shifting element and light reflected from the light-shifting element is directed out of the housing after reflecting from the housing.

In another aspect of the disclosure, a light assembly includes a base, a housing coupled to the base, and a plurality of light sources coupled to and within the housing. The light sources generate light. A control circuit is electrically coupled to the light sources for driving the light sources. The control circuit is housed within the base.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

Corresponding reference numerals indicate corresponding parts throughout the several views of the drawings.

DETAILED DESCRIPTION

Figure 1:
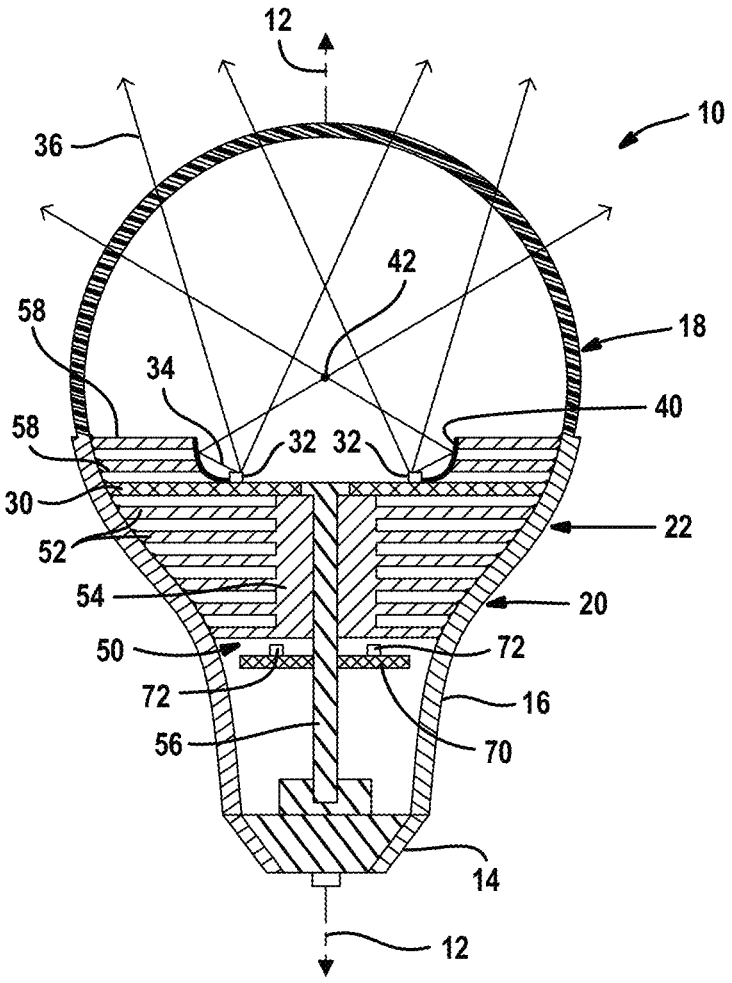
FIG. 1 is a cross-sectional view of a first example of a lighting assembly according to the present disclosure.

The following description is merely exemplary in nature and is not intended to limit the present disclosure, application, or uses. For purposes of clarity, the same reference numbers will be used in the drawings to identify similar elements. As used herein, the phrase "at least one of A, B, and C" should be construed to mean a logical (A or B or C), using a non-exclusive logical OR. It should be understood that steps within a method may be executed in different order without altering the principles of the present disclosure.

It should be noted that in the following figures various components may be used interchangeably. For example, several different examples of control circuit boards and light source circuit boards are implemented. As well, various shapes of light redirection elements and heat sinks are also disclosed. Various combinations of heat sinks, control circuit boards, light source circuit boards, and shapes of the light assemblies may be used. Various types of printed traces and materials may also be used interchangeably in the various examples of the light assembly.

In the following figures, a lighting assembly is illustrated having various examples that include solid state light sources such as light-emitting diodes (LEDs) and solid state lasers with various wavelengths. Different numbers of light sources and different numbers of wavelengths may be used to form a desired light output depending upon the ultimate use for the light assembly. The light assembly provides an opto-thermal solution for a light device and uses multiple geometries to achieve the purpose.

Referring now to FIG. 1, a cross-section of a light assembly 10 is illustrated. Light assembly 10 may be rotationally symmetric around a longitudinal axis 12. The light assembly 12 includes a lamp base 14, a housing 16, and a cover 18. The lamp base or base 14 is used for providing electricity to the bulb. The base 14 may have various shapes depending upon the application. The shapes may include a standard Edison base, or various other types of larger or smaller bases. The base 14 may be various types including screw-in, clip-in or plug-in. The base 14 may be at least partially made from metal for making electrical contact and may also be used for thermal heat conduction and dissipation. The base 14 may also be made from material not limited to ceramic, thermally conductive plastic, plastic with molded circuit connectors, or the like.

The housing 16 is adjacent to the base 14. The housing 16 may be directly adjacent to the base 14 or have an intermediate portion therebetween. The housing 16 may be formed of a metal or other heat-conductive material. One example of a suitable metal is aluminum. The housing 16 may be formed in various ways including stamping. Another way of forming the housing 16 includes injected-molded metals such as Zylor®. Thicksoform® molding may also be used. The housing 16 may include a hyperboloidal-shaped portion 20 and another rotated conical section such as a partial ellipsoid or a partial paraboloid portion 22. The housing 16 may also be a free-form shape.

The cover 18 may be a partial spheroid or ellipsoid in shape. The cover 18 may be formed of a transparent or translucent material such as glass or plastic. The cover 18 may be designed to diffuse light and minimize backscattered light trapped within the light assembly. The cover 18 may be coated with various materials to change the light characteristics such as wavelength or diffusion. An anti-reflective coating may also be applied to the inside of the cover 18. A self-radiating material may also be used which is pumped by the light sources. Thus, the light assembly 10 may be formed to have a high color rendering index and color perception in the dark. The housing 16 and cover 18 form an enclosure around light sources 32. The base 14 may also be included as part of the enclosure.

The light assembly 10 includes a substrate or circuit board 30 used for supporting solid state light sources 32. The circuit board 30 may be planar (as illustrated) or curved as described below. The circuit board 30 may be thermally conductive and may also be made from heat sink material. Solder pads of the light sources may be thermally and/or electrically coupled to radially-oriented copper sectors or circular conductive elements over-molded onto a plastic base to assist in heat conduction. In any of the examples below, the circuit board 30 may be part of the heat sink.

The light sources 32 have a high lumen-per-watt output. The light sources 32 may generate the same wavelength of light or may generate different wavelengths of light. The light sources 32 may also be solid state lasers. The solid state lasers may generate collimated light. The light sources 32 may also be light-emitted diodes. A combination of different light sources generating different wavelengths may be used for obtaining a desired spectrum. Examples of suitable wavelengths include ultraviolet or blue (e.g. 450-470 nm). Multiple light sources 32 generating the same wavelengths may also be used. The light sources 32 such as light-emitting diodes generate low-angle light 34 and high-angle light 36. High-angle light 36 is directed out through the cover 18.

Often times in a typical light bulb, the low-angle light is light not directed in a working direction. Low angle light is usually wasted since it is not directed out of the fixture into which the light assembly is coupled.

The low-angle light 34 is redirected out of the cover 18 using a reflector 40. The reflector 40 may be various shapes including a paraboloid, ellipsoid, or free-formed shape. The reflector 40 may also be shaped to direct the light from the light sources 32 to a central or common point 42. The reflector 40 may have a coating for wavelength or energy shifting and spectral selection. Coating one or both of the cover 18 and the reflector 40 may be performed. Multiple coatings may also be used. The common point 42 may be the center of the spheroid or ellipsoid of the cover 18.

It should be noted that when referring to various conic sections such as an ellipsoid, paraboloid or hyperboloid only a portion of the conic section that is rotated around an axis may be used for a particular surface. In a similar manner, portions of a spheroid may be used.

The circuit board 30 may be in direct contact with a heat sink 50 or a circuit board as described below. The heat sink 50 may include a plurality of fins 52 that form layers and extend in a perpendicular direction to the longitudinal axis 12 of the light assembly 10. The fins 52 may be spaced apart to allow heat to be dissipated therefrom. The heat sink 50 may also include a central portion 54. The central portion 54 may contact the circuit board 30 or a central control circuit board as described below. The central portion 54 may be generally cylindrical in shape with an opening 114 therethrough and the fins 52 extending therefrom. The opening 114 therethrough may include a heat stake 56 disposed therein. The heat stake 56 may contact the circuit board 30 and thermally conduct heat to the central portion 54 and ultimately to the fins 52. The heat stake 56 may also thermally conduct heat to the lamp base 14. The heat stake 56 may also receive heat from fins 52.

The fins 52 may be planar in shape. The planes of the fins 52 may be perpendicular to the longitudinal axis and contact the housing 16. It may not be necessary for direct contact between the fins 52 and the housing 16 depending on various design factors. However, the outer edges of the fins 52 of the heat sink 50 may contact the housing 16.

The housing 16 may thus conduct heat away from the light sources 32 of the circuit board for dissipation outside the light assembly.

Additional fins 58 may be disposed above the circuit board 30. The additional fins 58 may also be in thermal communication with the circuit board 30. The fins 58 may also support the reflectors 40. Fins 58 may also be in direct or thermal contact with the housing 16.

A control circuit board 70 may also be included within the light assembly 10. The control circuit board 70 is illustrated as planar and circular. Different examples of the circuit board 70 may be implemented, such as a cylindrical or longitudinally-oriented circuit board. The circuit board 70 may be various shapes.

The control circuit board 70 may include various control chips 72 that may be used for controlling various functions of the light sources 32. The control chips 72 may include an alternating current to direct current converter, a dimming circuit, a remote control circuit, discrete components such as resistors and capacitors, and a power circuit. The various functions may be included on an application-specific integrated circuit. Although only one control circuit board 70 is illustrated, multiple circuit boards may be provided within the light assembly 10. The circuit board 70 may also be in thermal communication with the heat stake 56. The heat stake 56 may thus conduct heat away from the circuit board 70 toward the lamp base 14 or through the heat stake 56 to the central portion 54 and to the fins 52.

Figure 2B:
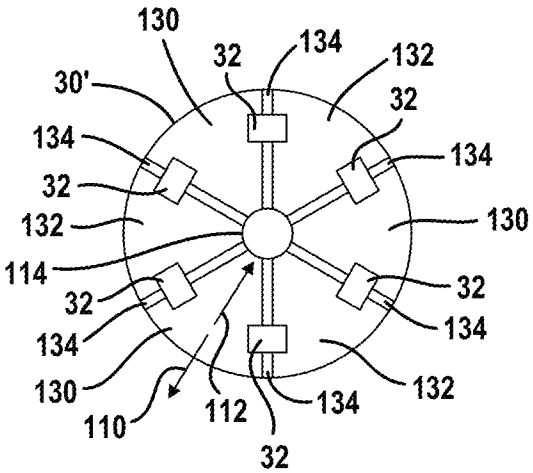
FIG. 2B is a top view of an alternate example.
Figure 2C:
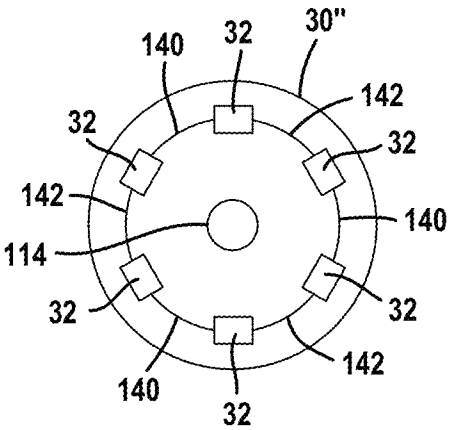
FIG. 2C is a top view of another alternate example.
Figure 2A:
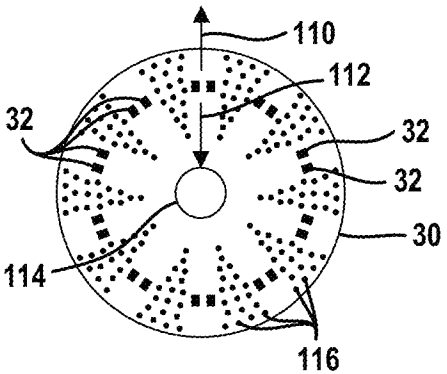
FIG. 2A is a top view of a circuit board according to the present disclosure.

Referring now to FIG. 2A, one example of a circuit board 30 is illustrated. The circuit board 30 includes the plurality of light sources 32 thereon. The circuit board 30 includes a radial outward thermal path 110 and a radially inward thermal path 112. The opening 114 may be provided through the circuit board 30. The opening 114, as was illustrated in FIG. 1, may have the heat stake 56 therethrough. The opening 114 may also remain open to allow air flow circulation within the light assembly 10. The opening 114 may be replaced by more than one opening. The openings may be sized to receive a wire or wires from a control circuit board to make an electrical connection to the circuit board 30. Such examples will be described below.

Although only light sources 32 are illustrated in FIG. 2, more electrical components for driving the light sources may be incorporated onto the circuit board 30. Thermal vias 116 may be provided throughout the circuit board 30 to allow a thermal path to the heat sink 50. As is illustrated, the thermal vias 116 are generally laid out in a triangular or pie-piece arrangement but do not interfere with the thermal paths 110 and 112. Thermal vias 116 may be directly under the light sources.

The circuit board 30 may be made out of various materials to form a thermally-conductive substrate. The solder pads of the light sources may be connected to radial-oriented copper sectors or circular conductive elements that are over-molded into a plastic base to conduct heat away from the light sources. By removing the heat from the area of the light sources, the lifetime of the light assembly 10 may be extended. The circuit board 30 may be formed from two-sided FR4 material, heat sink material, or the like. If the board material is electrically conductive, the electrical traces may be formed on a non-conductive layer that is formed on the electrically conductive surface of the circuit board.

Referring now to FIG. 2B, an alternative example of the circuit board 30' is illustrated. The circuit board 30' may include a plurality of circuit trace sectors 130 and 132 that are coupled to alternate voltage sources to power the light sources 32. The sectors are separated by a non-conductive gap 134. The light sources 32 may be electrically coupled to alternate sectors 130, 132. The light sources 32 may be soldered or otherwise electrically mounted to the two sectors 130, 132.

Each sector 130, 132 may be disposed on a non-conductive circuit board 30'. As mentioned above, the circuit board 30' may also be formed of a heat sink material. Should the heat sink material be electrically conductive, a non-conductive pad or layer may be placed between the sectors 130, 132 and the circuit board 30'.

The opening 114 is illustrated as a circle. The opening 114 may also be replaced by two smaller openings for coupling a wire or wires from a control circuit board thereto. Such an example will be described further below.

Referring now to FIG. 2C, another example of a circuit board 30" is illustrated. The circuit board 30" includes the light sources 32 that are spaced apart by circuit traces 140 and 142. The circuit traces 140 and 142 may have different voltages used for activating or enabling the light sources 32. The circuit traces 140, 142 may be printed on a substrate such as a heat sink substrate. Electrical connections may be made from the control circuit board.

Figure 3A:
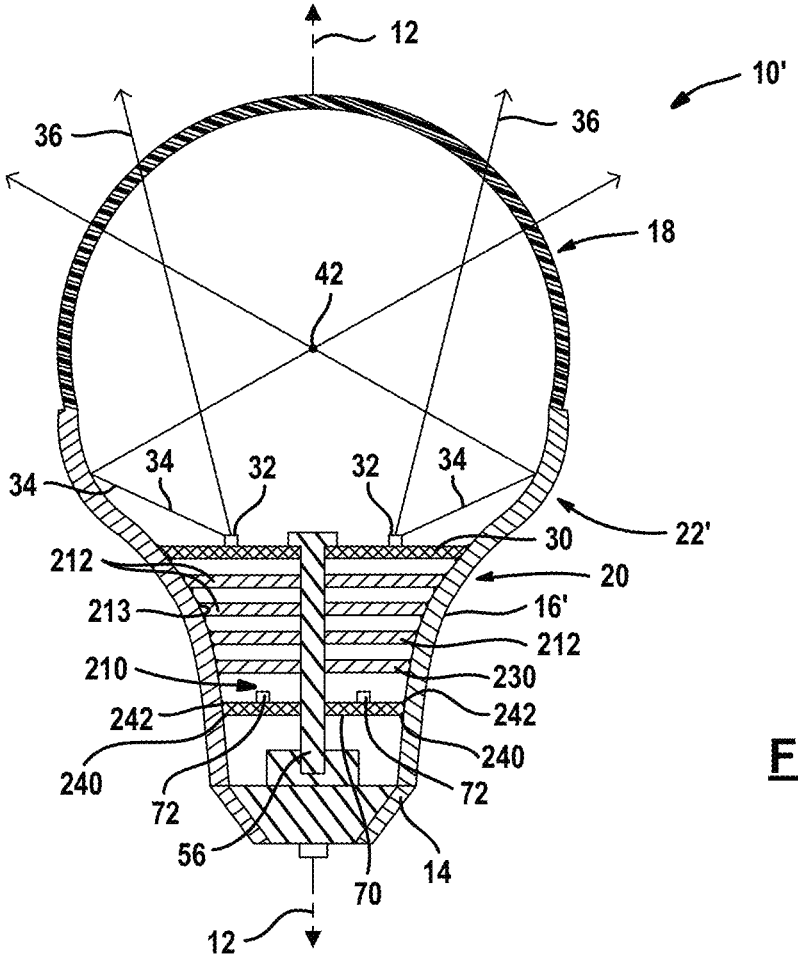
FIG. 3A is a cross-sectional view of the second example of a lighting assembly according to the present disclosure.
Figure 3B:
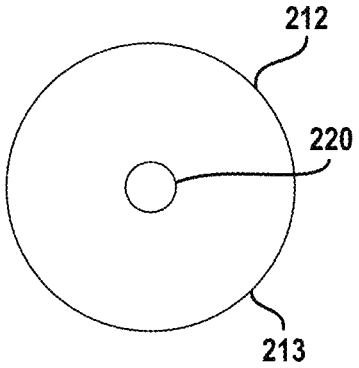
FIG. 3B is a top view of a heat sink fin of FIG. 3A.

Referring now to FIGS. 3A and 3B, a second example of a light assembly 10' is illustrated. In this example, the longitudinal axis 12 and the base 14 are similar. The housing 16' may include the hyperboloid portion 20 as illustrated in FIG. 1 and an ellipsoid portion 22'. The ellipsoid portion 22' may be used as a reflector to redirect low-angle light 34 emitted from the light-emitting sources 32. The inside of the housing 16' may be used as the reflective surface. The inside surface of the housing 16' may be anodized aluminum or another reflective surface. High-angle light 36 is transmitted directly through the cover 18. The common point 42 may be one focal point of the ellipsoid while the ring of light sources 32 may form the second focal point of the ellipsoid. Because a ring of light sources is used as the second focal point of the ellipsoid, the ellipsoid may be referred to as an offset ellipsoid. The construction of the ellipsoid will be further described below.

In this example a heat sink 210 may be constructed in a different manner to that illustrated in FIG. 1. However, it should be recognized that the construction of the heat sink 210 in FIG. 1 may be incorporated into the optical configuration of FIG. 3. In this example, a plurality of heat-sink fins 212 is disposed within the light assembly 10'. The heat sink 210 may comprise a plurality of disks with opening 220 therethrough as is best shown in FIG. 3B. Each heat sink fin 212 may resemble a washer. The heat-sink fins 212 may be in thermal communication with the heat stake 56 and the paraboloidal or hyperboloidal portion 16' of the housing 20. Each heat-sink fin 212 may conduct heat isotropically using materials such as aluminum or copper. The heat-sink fins 212 may also conduct heat anistropically using materials such as graphite, aluminum and magnesium. The outer diameter of the heat sink 210 varies according to the shape of the hyperboloidal portion 16. The outer edge 213 of the fins 212 of the heat sink 210 may contact the housing 16'. The contour or outer shape of the disk is hyperboloidal. The opening 220 may receive the heat stake 56 or may have the heat stake 56 removed as will be described below.

The light sources 32 may also be mounted on a heat sink fin 212. The heat sink fin 212 may have conductive traces thereon to form the electrical interconnections using part of the heat sink to house and interconnect the light sources. This may be done in any of the examples set forth herein.

Notches 240 and 242 may snap-fit the heat-sink fins 212 within the housing. One lower notch 240 and one upper notch 242 are illustrated for simplicity. However, each of the heat-sink fins 212 and the circuit board 30 may be secured to the housing in a similar manner. Because the heat-sink fins 212 and the circuit board 30 may be flexible, snap-fitting the circuit board 30 and the heat-sink fins 212 into place is possible. Of course, other methods for securing the heat-sink fins 212 and the circuit board 30 may be used. These may include securing the circuit board and heat-sink fins to the heat stake 56 and securing the heat stake 56 to the lamp base 14, using mechanical fasteners or adhesives.

Figure 4A:
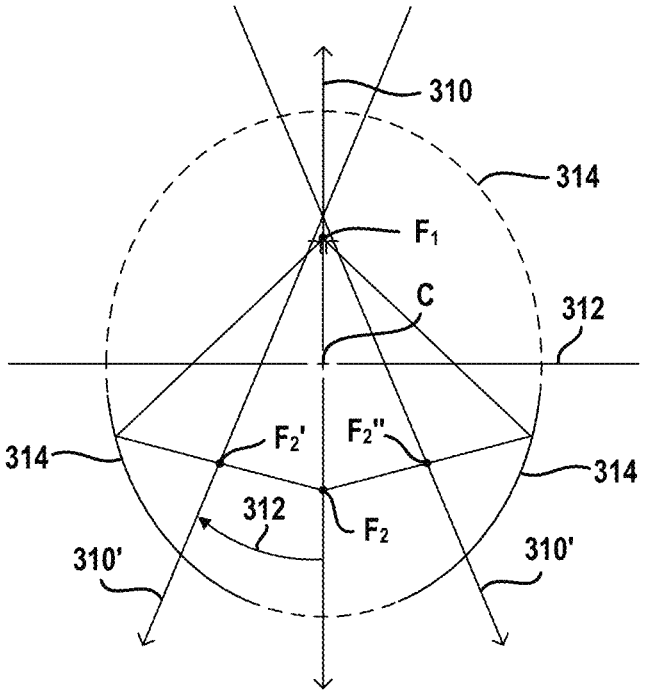
FIG. 4A is a side view of an ellipse.

Referring now to FIG. 4A, a method for forming the shifted or offset ellipsoid illustrated above is set forth. The ellipsoid has two focal points: F1 and F2. The ellipsoid also has a center point C. The major axis 310 of the ellipse 308 is the line that includes F1 and F2. The minor axis 312 is perpendicular to the major axis 310 and intersects the major axis 310 at point C. To form the shifted ellipsoid, the focal points corresponding to the light sources 32 are moved outward from the major axis 310 and are shifted or rotated about the focal point F1. The ellipsoid is then rotated and a portion of the surface of the ellipsoid is used as a reflective surface. The angle 312 may be various angles corresponding to the desired overall geometry of the device. In an ellipse, light generated at point F2 will reflect from a reflector at the outer surface 314 of the ellipse and intersect at point F1.

Figure 4B:
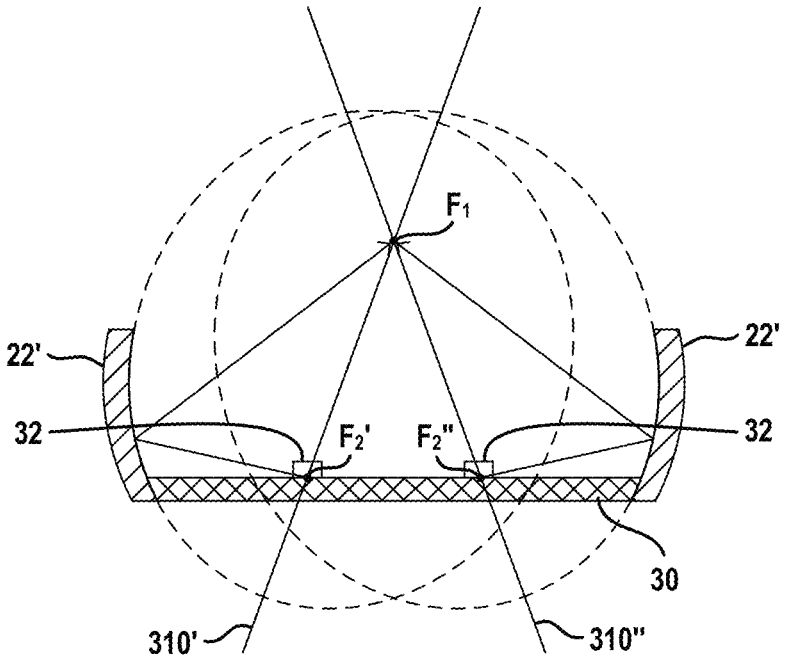
FIG. 4B is a cross-sectional view of a portion of an ellipsoid.

Referring now to FIG. 4B, the shifted or offset ellipsoid will reflect light from the focal points F2' and F2" to intersect on the focal point F1. The focal points F2' and F2" are on a ring of light sources 32 whose low-angle light is reflected from the shifted ellipsoid surface and the light is directed to focal point F1. The construction of the ellipsoid can thus be seen in FIG. 4B since the focal point F2 now becomes the ring that includes F2' and F2". The circuit board 30 may be coupled to the elliptical portion 22'.

The heat sink 210 of a light assembly corresponding to that illustrated in FIG. 1 or 3A may be used.

Figure 5:
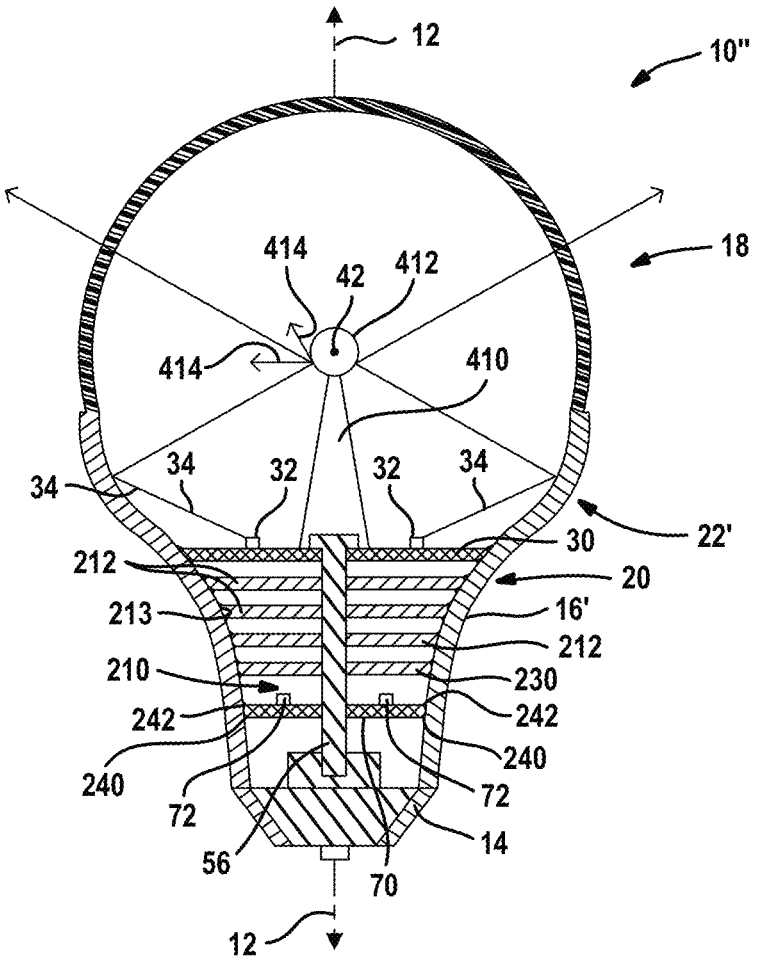
FIG. 5 is a cross-sectional view of a third example of the present disclosure.

Referring now to FIG. 5, an example similar to that of FIG. 4B is illustrated. In this example, a stand-off or plurality of stand-offs 410 is constructed to support a light-shifting element 412. The low-angle light 34 from the light sources 32 is directed toward the common point 42. As mentioned above, the common point 42 may be the center of the cover portion 18 and a focal point of the ellipsoidal portion 22'. The light-shifting element 412 may be coated with a light-frequency (energy) shifting material so that low-angle light is provided with a different light characteristic which is added to the direct light from the light sources 32 to form a desired output spectrum of light frequencies. For example, the light-shifting element 42 may be coated within phosphors, nano-phosphors or fluorescent dyes to achieve a desired spectral distribution. One example is the use of blue light sources or lasers that, when the blue light comes into contact within the light or energy-shifting material, another color such as white light may be emitted. The energy may be absorbed by the light-shifting material and re-radiated in various directions as indicated by the arrows 414. One light ray may be scattered in various directions with a wavelength different from the wavelength of the light sources 32. The light-shifting element 412 may be solid material such as metal so that light reflects therefrom. The light-shifting element 412 may be spherical or other shapes.

Figure 6:
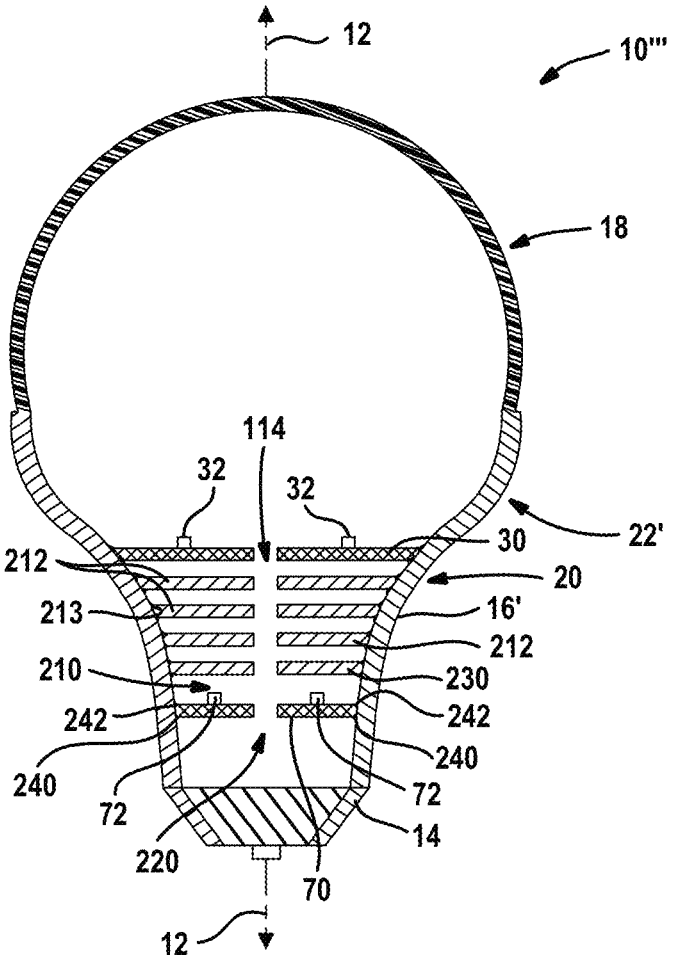
FIG. 6 is a cross-sectional view of a fourth example of a light bulb according to the present disclosure.

Referring now to FIG. 6, an example of light assembly 10''' similar to FIG. 3A is illustrated except that the heat stake 56 is removed from the openings 114 in each heat sink fin 212. In place of the heat stake 56 of FIG. 3A, the openings 114 are left open within the fins 212 of the heat sink so that air may circulate within the light assembly 10". The openings 114 may also align with an opening 220 in the circuit board 70 so that the air may circulate to dissipate heat within the light assembly 10".

Figure 7:
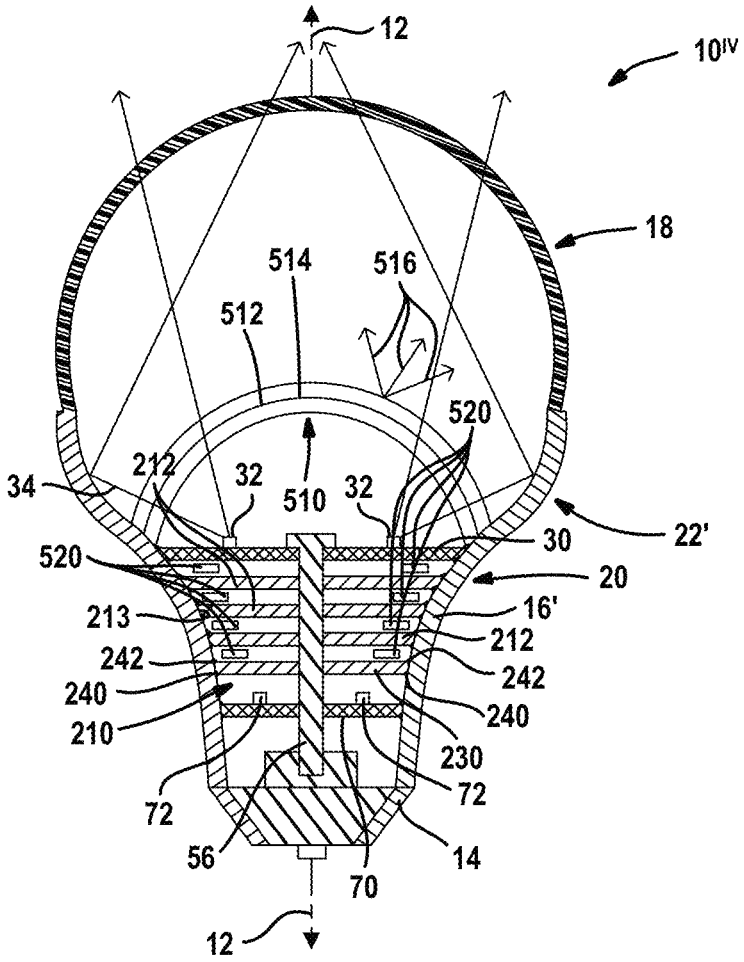
FIG. 7 is cross-sectional view of a light bulb according to a fifth example of the present disclosure.

Referring now to FIG. 7, another example of light assembly 10$^{iv}$ similar to that of FIG. 3A is illustrated and thus the common reference numerals will not be further described. In this example, a light-shifting element such as a dome 510 is illustrated. The dome 510 may include the frequency-shifting or diffusing material such as those described above. A film or coating may be applied to the dome 510 to provide light-shifting or diffusion of the frequencies of the light.

Any of the examples set forth above or below may include a light-shifting element such as a dome 510. The dome 510 may be made out of various materials including a light filter layer 512 and a light-shifting layer 514. The light filter layer 512 may be used to pass a wavelength of light therethrough. The wavelength may correspond to the wavelength of the light source 32. For example, should the light source 32 be a blue laser or blue LED, the filter 512 may pass the blue light therethrough. The shifting layer 514 may shift the wavelength of light to another wavelength besides blue. For example, the blue wavelength may activate the light-shifting element 514 to generate white light therefrom. The white light may be generated in a straight line or may be scattered. Scattering light is indicated by the arrows 516. Light may be scattered back toward the light sources 32 as well. However, the boundary between the filter layer 512 and the light-shifting layer 514 may reflect back all but the blue light. The light reflected from the boundary between the filter 512 and the light-shifting layer 514 may ultimately exit through the cover 18.

The example of FIG. 7 also includes perforations 520 within or through the housing 16'. The perforations 520 may be openings adjacent to the fins 52 to provide an external conductive path to dissipate heat from the light assembly 10$^{iv}$. The perforations 520 may be stamped or otherwise formed within or through the housing 16' during manufacturing. The light assembly 10$^{iv}$ does not require a vacuum as does an incandescent bulb. Any example described above or below may include perforations 520.

Figure 8:
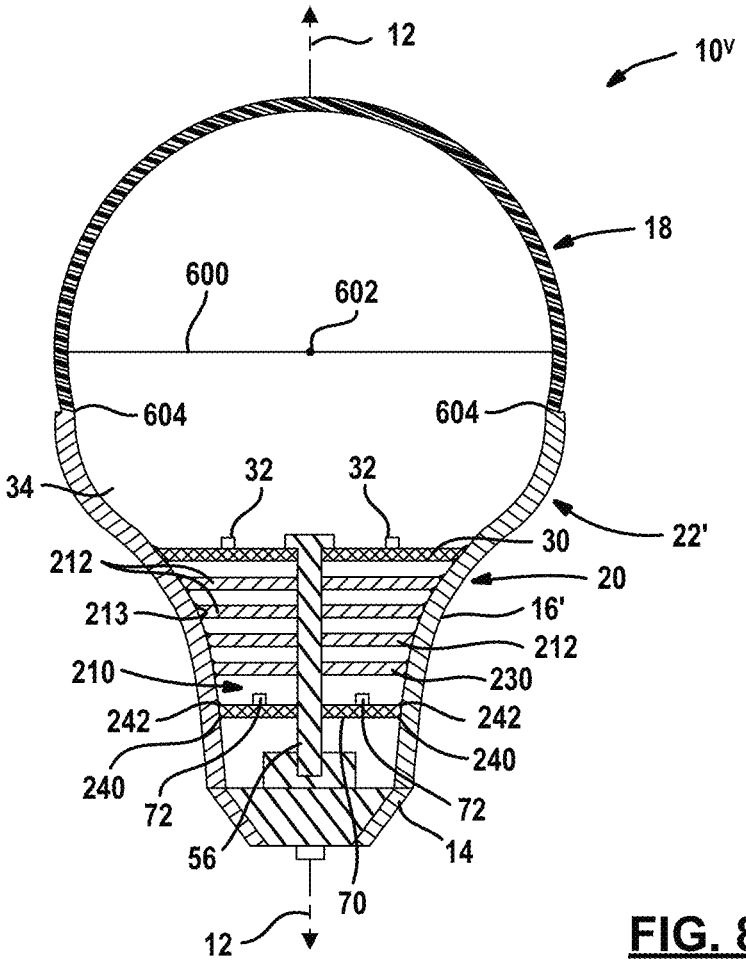
FIG. 8 is a cross-sectional view of a sixth example of the present disclosure.

Referring now to FIG. 8, an example of light assembly 10$^{v}$ similar to FIG. 3A is illustrated. In this example, a light-shifting element such as a film 600 is disposed across the cover 18. Most of the light, if not all of the light, may travel through the light-shifter 600 and have the light shifted. It should be noted that the amount of light-shifting material on or within the film 600 may change across its length according to a gradient. The gradient may include more light shifting toward the middle or center 602 of the film and less light shifting toward the cover 18. That is, the light-shifting rate may be a first rate adjacent to the cover and a second rate more than the first rate near the center of the cover.

The position of the film relative to the circuit board 30 may vary along the axis 12 depending on the amount of light to be shifted. If less light is desired to be shifted, the film may be suspended closer to the top of the cover 18 away from base 14. If all the light is desired to be shifted, the light-shifter 600 may be suspended across the cover 18 or the housing 16 near the junction of the housing 16' and the cover 18 at point 604.

Figure 8A:
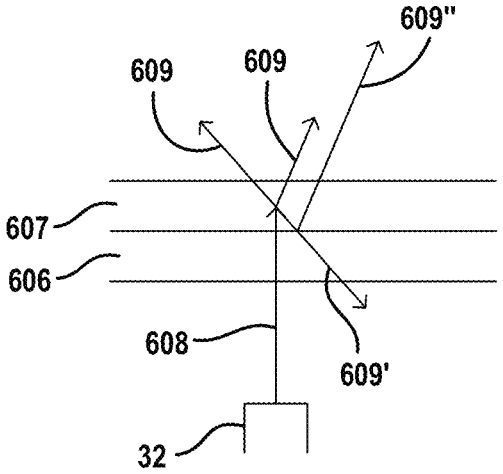
FIG. 8A is an enlarged cross-sectional view of a light-shifter and filter.

Referring now to FIG. 8A, the light-shifter 600 may be formed on a filter 604 for a wavelength such as blue. The light-shifter 600, or more properly the particles or elements within the light-shifter, may scatter light in various directions including in the direction of the light source. If the filter has the same filter characteristics as the light source, light will be transmitted from the light source through the filter. Light radiated back toward the light source will be reflected at the light-shifter 600/filter 606, interface 607 and directed away from the light source. Blue light or the light transmission wavelength of the filter will pass back through the filter toward the light source. As is illustrated, light 608 from the light source is scattered as indicated by arrows 609. Part of the light is scattered to light rays 609' which may be reflected at the interface 607 as indicated by arrows 609". The light entering the filter 606 that was scattered from the light-shifter 600 is in the same wavelength of the light sources 32. The light reflected at the interface 607 may be wavelengths other than the wavelength of the wavelength-passing material or band-pass filter 606. The filter 606 may be a band-pass filter that passes the wavelength of light from the light source 32 therethrough which is scattered by the light-shifter 600. This is similar to that described above with respect to FIG. 7. The combination of the light-shifter 600 and filter 606 may be referred to as a pump; in this example, a blue pump.

Figure 9:
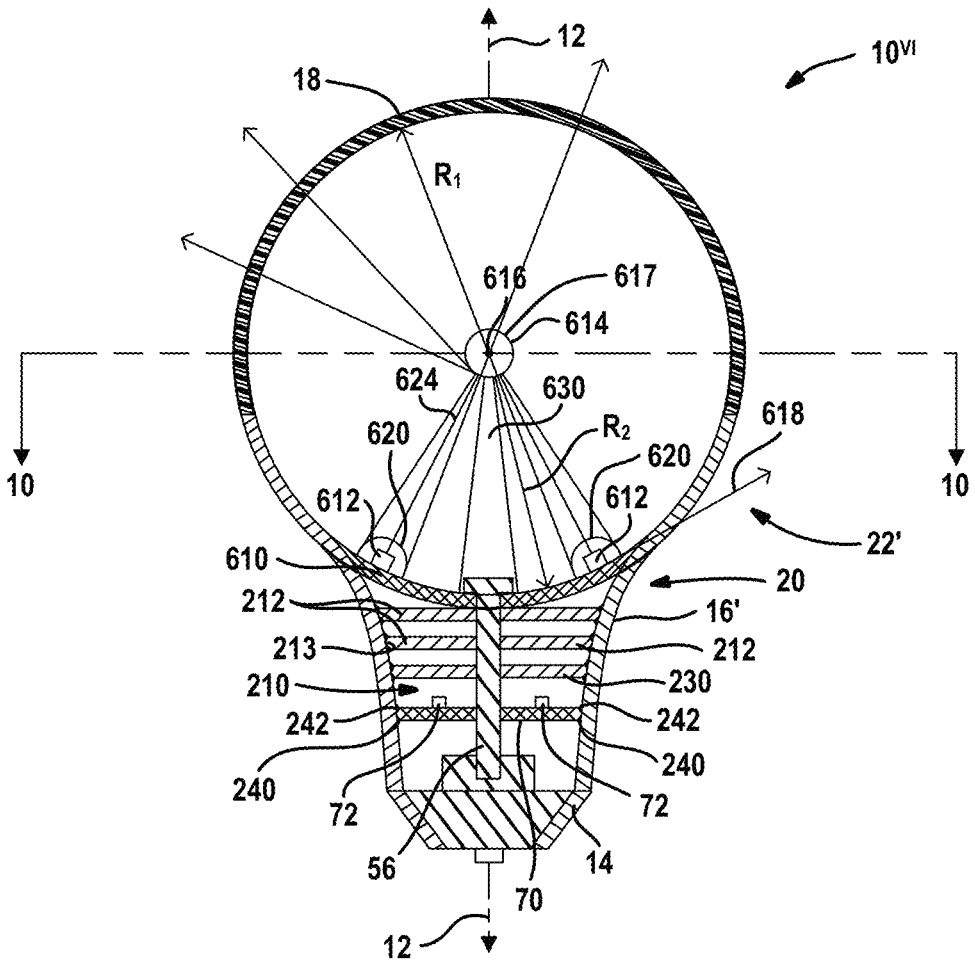
FIG. 9 is a cross-sectional view of a seventh example of the present disclosure.
Figure 10:
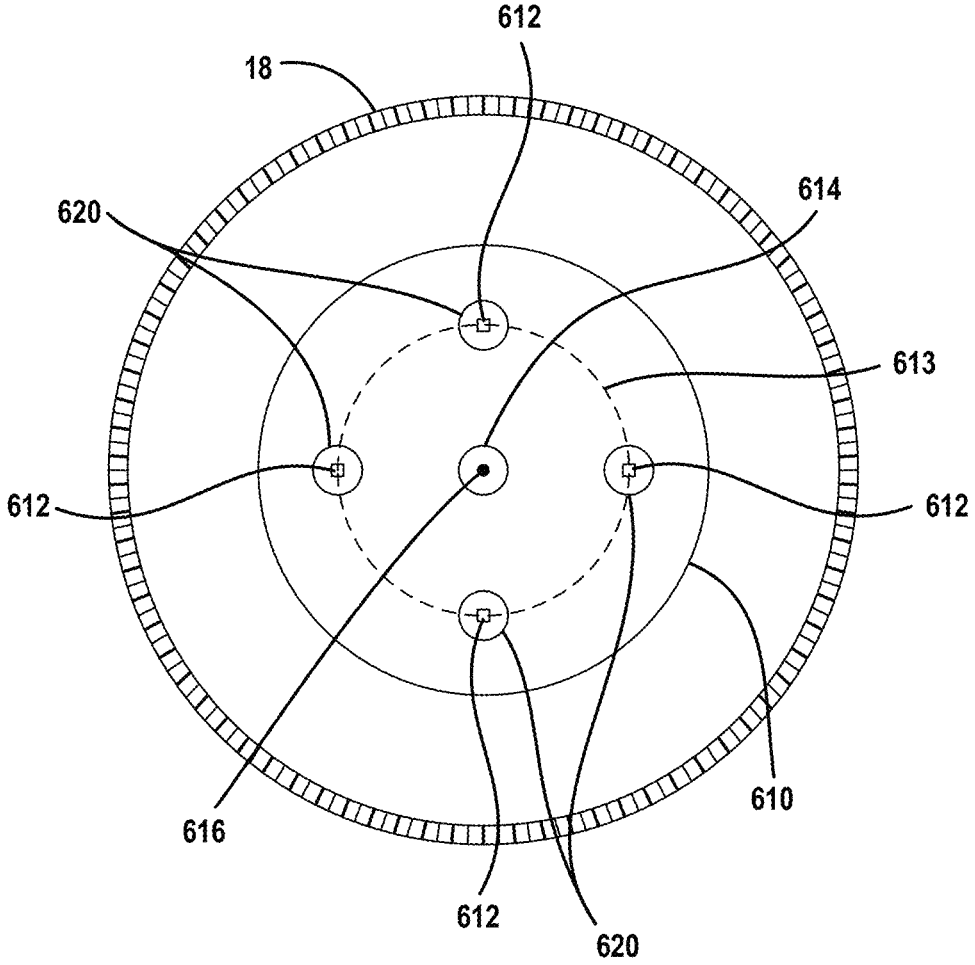
FIG. 10 is a cross-sectional view along line 10-10 of FIG. 9.

Referring now to FIGS. 9 and 10, another example of the light assembly 10$^{iv}$ is illustrated. In this example, a circuit board 610 may have a curved or partial spheroidal shape. The circuit board 610 may be a conventional fiberglass circuit board substrate or a metal substrate with an isolation layer thereon. Circuit traces may be formed on the isolation layer then insulated. For example, an aluminum substrate with an anodized layer may have circuit traces thereon. The circuit traces may be coated with an insulator. The circuit board 610 may be planar then heated and molded into the desired shape.

The circuit board 610 includes light sources 612 thereon. The light sources 612 may be disposed in a circle or ring 613 as illustrated above and in FIG. 10. The circle 613 may intersect each light source 612. The circle 613 may be disposed on a plane perpendicular to the longitudinal axis 12 of the light assembly 10$^{vi}$. The cover portion 18 may be a partial spheroid as mentioned above. The radius R1 of the spheroid of the cover portion 18 and the radius R2 of the circuit board 610 may have the same radius. The radii R1 and R2 may also be the same. The cover portion 18 may also be an ellipsoid. The center of the ellipsoid may correspond to the center 616 of the cover portion 18. A light shifter 614 may be disposed at a center 616 of the spheroid of the circuit board 610. The light shifter 614 may be similar to that illustrated in FIG. 5. That is, the light shifter 614 may have a light frequency shifting coating or film 617 thereon for shifting at least a portion of the light that travels through the light shifter 614 and is eventually transmitted through the cover 18.

The configuration of FIG. 9 may be formed as in FIG. 4A with F1 corresponding to 616 and F2' and F2" corresponding to light sources 612.

Each light source 612 may include a redirection element such as a lens 620 disposed in the light path for focusing the light from the light source 612 to the center 616. The lens 620 may be a converging lens. The light sources 612 may be parallel to a tangential line 618 to the surface of the spheroid of the circuit board 610. Light emitted along the center axis 624 of the light source intersects the point 616 and light shifter 614. The center axis is perpendicular to the tangential line 618. Thus, any light emitted from the light source 612 may converge at the center point 616. The light is shifted by the light shifter 614. Each lens may also be coated to provide light-shifting properties as well. Light sources using ultraviolet or blue light may thus be converted into various frequencies to provide white light.

The light shifter 614 may be supported from the circuit board 610 using a stand-off 630. The stand-off 630 may also be mounted to the stake 56 or directly to the circuit board 610 as illustrated.

Figure 11:
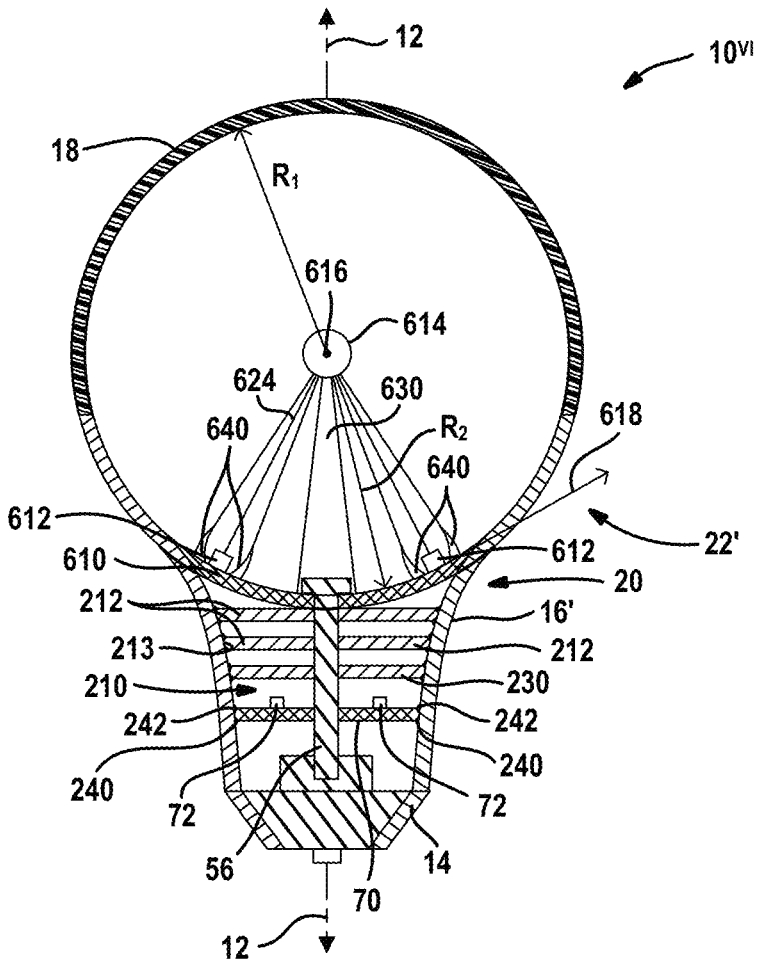
FIG. 11 is a cross-sectional view of another example of the disclosure including reflectors as light redirectional elements.

Referring now to FIG. 11, an example similar to FIGS. 9 and 10 is illustrated. In this example, the lenses 620 as redirection elements have been replaced with reflectors 640. The reflectors 640 may have a surface that is a portion of an ellipsoid or a portion of a paraboloid. The partially ellipsoidal shape may surround a portion of each light source 612. The light source 612 may be placed at one focal point of a spheroid, and the second focal point of the spheroid for the reflector 640 may be point 616. This is also similar to FIG. 4A in which F1 would correspond to 616 and F2' would correspond to one of the light sources 612. Each light source may have a separate reflector 640.

Figure 12:
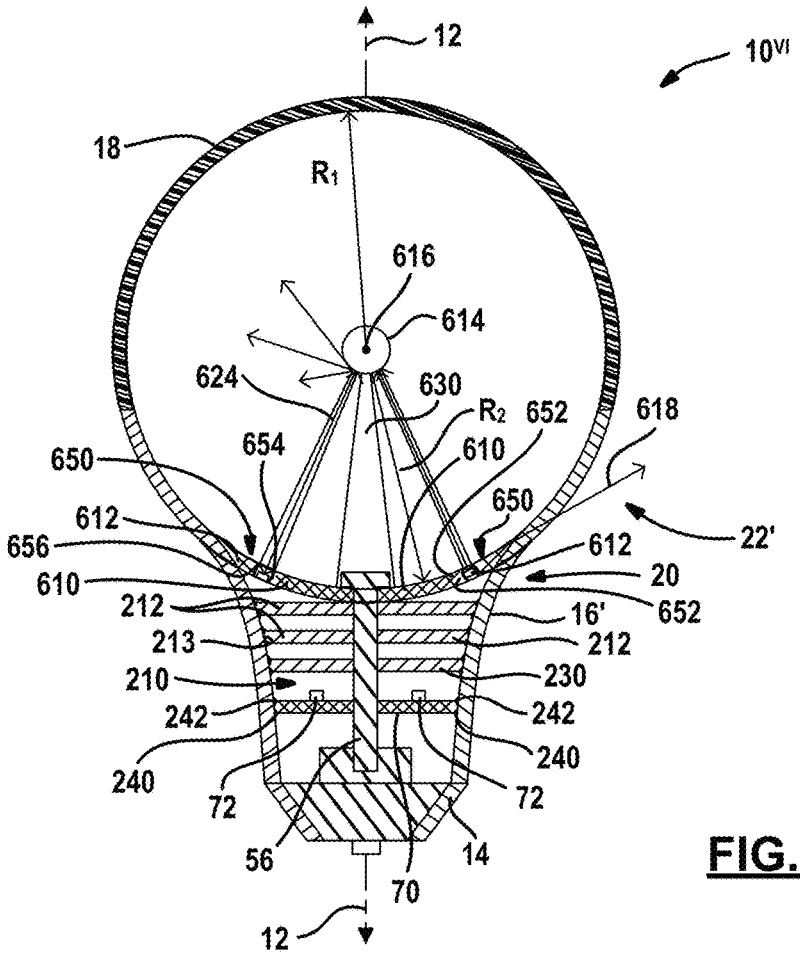
FIG. 12 is a cross-sectional view of a light assembly having surfaces as light redirection elements recessed within a circuit board.
Figure 12A:
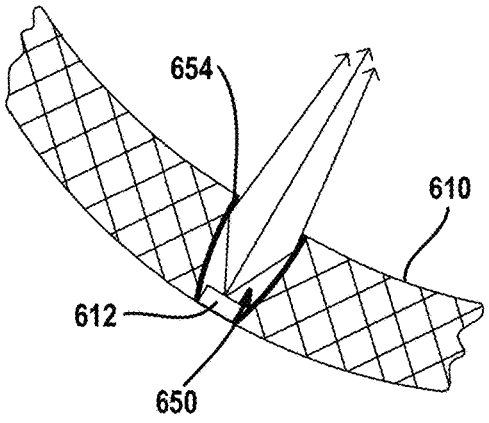
FIG. 12A is an enlarged cross-sectional view of the light source portion of FIG. 12.
Figure 12B:
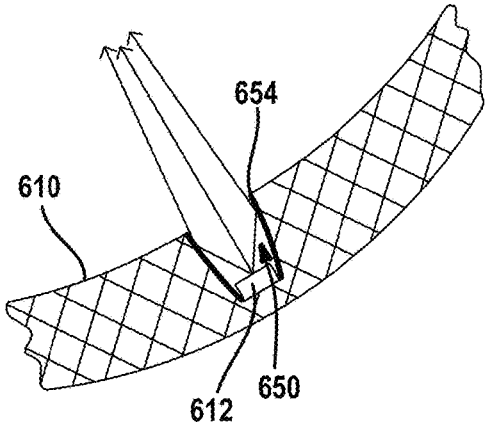
FIG. 12B is an alternative cross-sectional view for the light source portion of FIG. 12.

Referring now to FIGS. 12, 12A and 12B, an example similar to FIGS. 9 and 11 is illustrated. In FIG. 12, the reflectors 640 illustrated in FIG. 11 have been replaced by a recess 650 disposed within the circuit board 610. The recess 650 within a circuit board may be an opening 650 through the circuit board 610 or a recess partially through the circuit board 610 as illustrated in FIG. 12B. The opening 650 may have a surface 652 that has a reflector 654 adjacent thereto. The reflector could be a separate component of a metalized edge of the opening 650. The reflector 654 may be a metalized surface of the circuit board that has an ellipsoidal cross-sectional or paraboloidal shape. The metalized surface 614 may be disposed on an edge 652 of the circuit board 610.

The light source 612 may be affixed to a bottom surface 654 of the opening 650 of the circuit board 610 if the opening 650 does not extend fully through the circuit board 610. As illustrated in FIG. 12B, the light sources 612 may affix to the circuit board 610 or the reflective surface 654 if the opening 650 extends through the circuit board 610. Light from the light sources 612 reflect from the reflective surface 654 toward the point 616. Light traveling toward point 616 is reflected by the light shifter 614.

Figure 13:
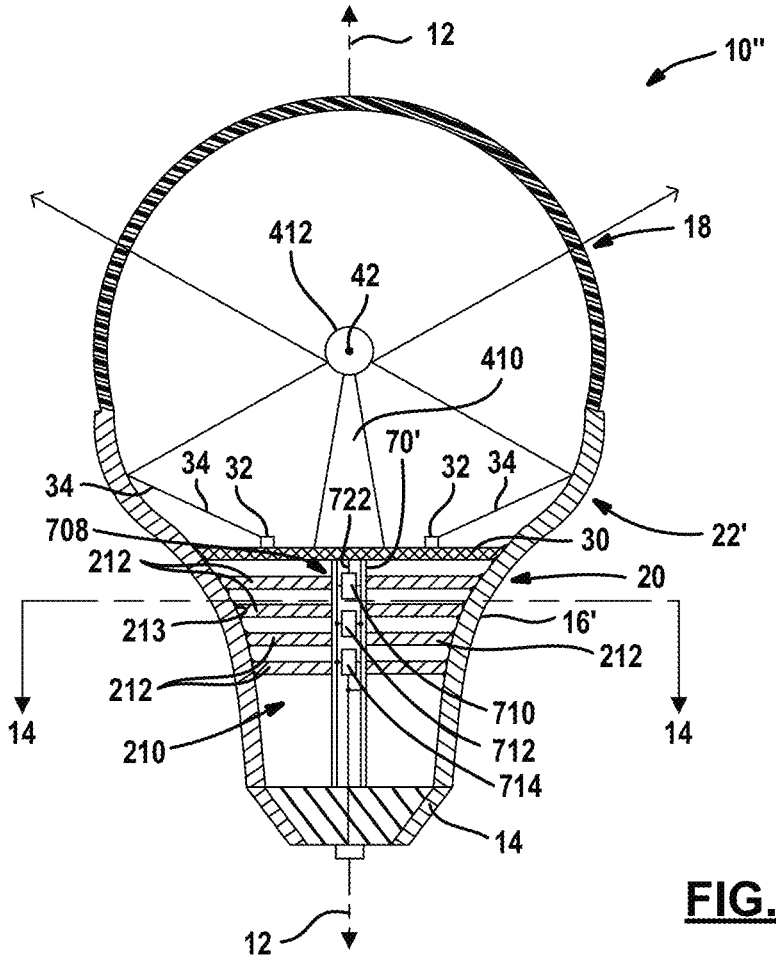
FIG. 13 is a cross-sectional view of a light assembly having a cylindrical control circuit therein.

Referring now to FIG. 13, a miniaturized control circuit board 70' is illustrated. The circuit board 70' may replace the heat stake 56 within the light assembly although the openings 708 through the heat-sink fins may be widened. The control circuit board 70' may include various components depending upon the application. One component may be an AC to DC converter 710. Other discrete components such as a plurality of resistors 712 and capacitors 714 may also be included on the control circuit board 70'. The control circuit board 70' may include input leads 716 and 718 that may be coupled to the AC circuit. Leads 720 and 722 may be coupled to a DC circuit. The leads 716, 718 may be coupled through a metallic base 14 of the circuit board 701 and provide AC power to the circuit. The leads 720, 722 may ultimately be coupled to the circuit board 30 and to the light sources 32.

The opening 708 between the control circuit board 701 and the heat-sink fins 212 may be constant. Small fingers 720 may extend from the heat-sink fins 212 to support the circuit board 70'. The fingers 720 may be large enough to provide axial support but small enough to provide airflow between the circuit board 70' and fins 212.

Figure 14:
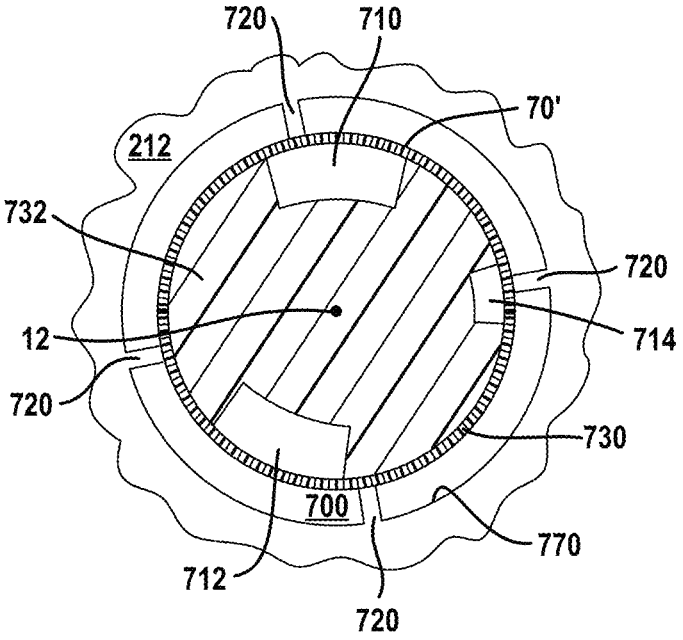
FIG. 14 is a cross-sectional view of the control circuit of FIG. 13.

Referring now to FIG. 14, the control circuit board 70 is illustrated in a cross-sectional view taken perpendicular to the longitudinal axis 12 of the light assembly. As can be seen, the components 710, 712, and 714 may be disposed on a circuit board 730 that has been formed in a cylindrical manner. The circuit board 730 may be various types of circuit boards, including a fiberglass circuit board or a metal substrate as described above.

The circuit board 730 may be filled with epoxy 732 after the circuit board is formed. That is, the circuit board 70' may be populated and formed into a cylindrical shape. The cylindrical shape may be formed before or after the device so is populated with the electrical components. Substantially all of the length of the cylindrical shape may be filled with an epoxy.

The circuit board 730 defines an interior portion and an exterior portion of the control circuit board 70'. The electrical components 710-714 are located within the interior of the cylindrical wall formed by the control circuit board 70'. The interior portion is filled with the epoxy 732.

FIG. 14 shows the opening or space between the control circuit board 70' and the heat-sink fins 212. Fingers 720 are also illustrated for axially supporting the control circuit board 70'.

It should be noted that a light-shifting element on the cover 18 or in various locations such as that illustrated in FIG. 5, FIG. 7, FIG. 8 and FIG. 9 may also be incorporated 65 within the light assembly illustrated in FIGS. 13 and 14.

Figure 15:
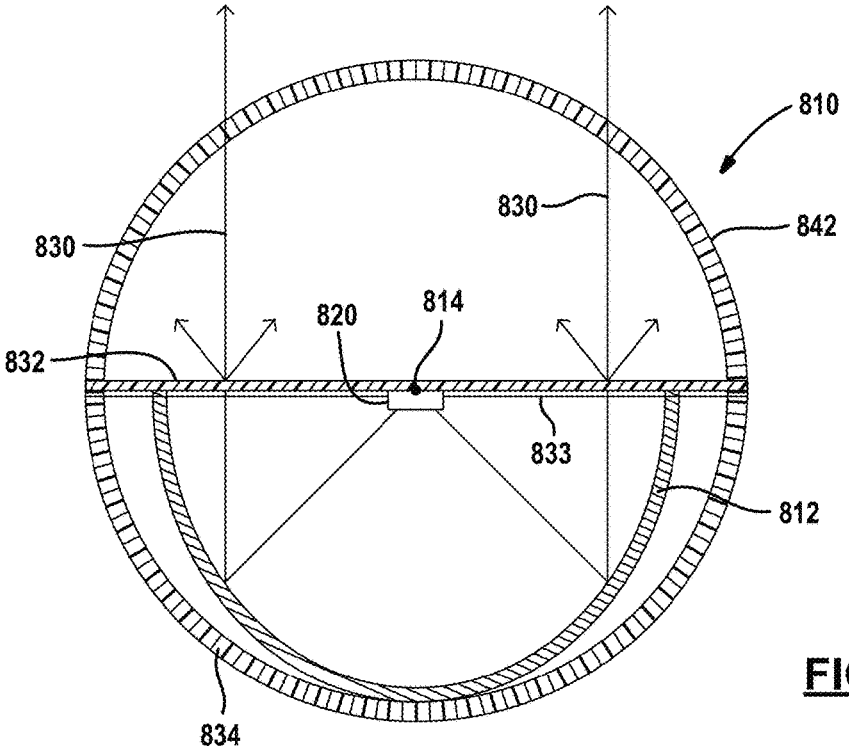
FIG. 15 is a cross-sectional view of a tubular light assembly according to the present disclosure.
Figure 16:
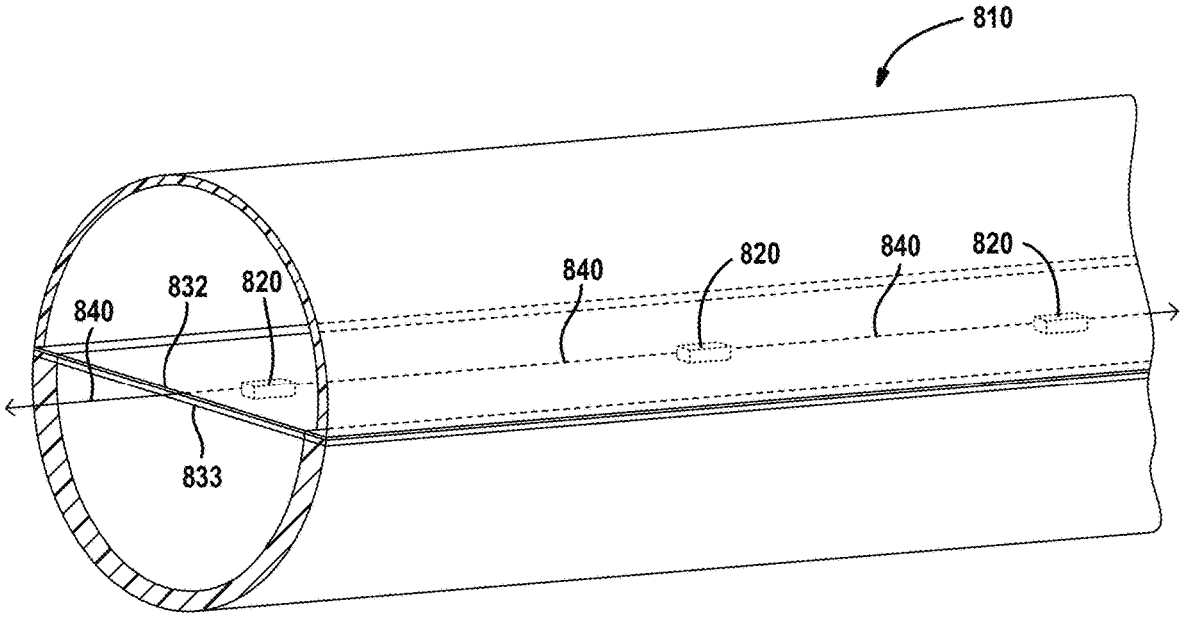
FIG. 16 is a perspective view of the light assembly of FIG. 15.
Figure 17:
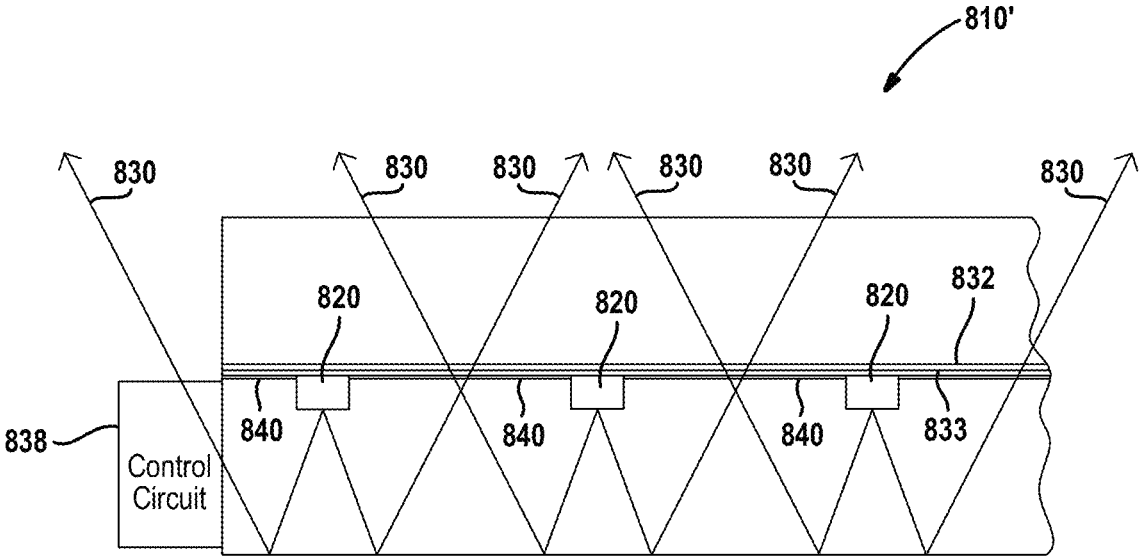
FIG. 17 is a longitudinal view of the light assembly of FIG. 15.

Referring now to FIGS. 15, 16, and 17, a tubular light assembly 810 is illustrated. The tubular light assembly 810 includes a reflective surface 812. The reflective surface 812 may be parabolic in shape. That is, the reflective surface 812 may be a parabolic cylinder.

The light assembly 810 includes a longitudinal axis 814. Light sources 820 may be disposed along the longitudinal axis 814. Light from the light sources 820 is directed toward the reflective surface 812.

The reflective surface 812 may be parabolic in shape. The parabolic shape may have a focal line coincident with the longitudinal axis 814 of the light assembly 810. Light rays 830 reflecting from the reflective surface 812 are collimated. In a longitudinal direction the light rays 830 are diffused.

A light-shifting element 832 may also be disposed within the light assembly 810. As is illustrated in FIGS. 15, 16, and 17, the light-shifting element 832 may comprise a film that extends from one edge of the reflecting surface 812 to another edge of the reflecting surface 812 across the light assembly 810. The light-shifting element 832 may be coupled to the reflective surface or to a housing 834. The light-shifting element 832 may also be coupled to a cover 842.

The light-shifting element 832 may have a light-selective (band-pass filtering or dichroic) film 833 associated therewith. That is, a material 833 may have a wavelength transmissive to the light source wavelength (such as blue or UV). The interface between the light-shifting element 832 and the film 833 will reflect wavelengths other than the selected wavelength as described above in FIGS. 7 and 8.

Figure 18:
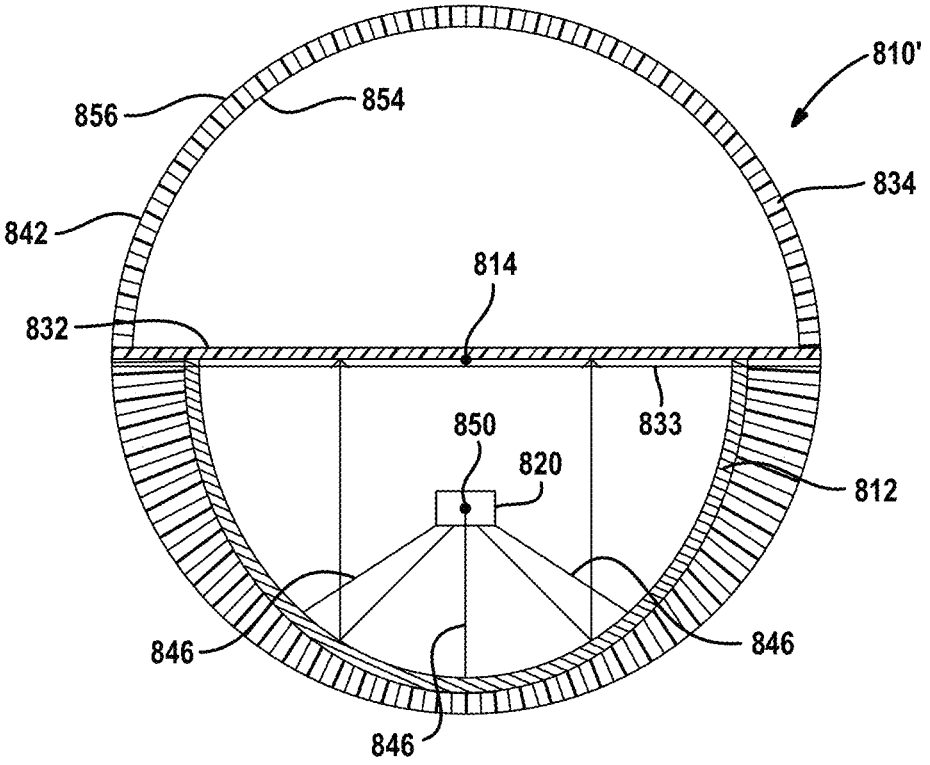
FIG. 18 is a cross-sectional view of a tubular light assembly having an alternative example to FIG. 15.

The housing 834 may be a cylindrical housing that has a half-circle cross-section. The housing 834 may be a separate component as illustrated in FIG. 15 or may be a single structure that has an outer surface and the inner surface being the reflective surface 812 as illustrated in FIG. 18. The materials may be metal, plastic, metal on plastic, or combinations.

As is best illustrated in FIG. 17, a control circuit 838 may be used to control the power to the light sources 820. More than one control circuit 838 may be located within a tubular light assembly 810. For example, a control circuit 838 may be located at each longitudinal end of the tubular light assembly 810. The control circuit 838 may have circuit traces 840 extending therefrom for providing power to the light sources 820. The circuit traces 840 may be formed on the surface of the light-shifting element 832. The traces 840 may also be separate wires coupled to the light sources from the control circuit 838.

As illustrated best in FIG. 15, the light-shifting element 832 may be located across a diameter of light assembly 810. The light sources 820 may be located at a center point of the tubular assembly that corresponds with the longitudinal axis 814. The light-shifting element 832 may thus define a plane that extends along the length of the light assembly 810.

The light-shifting element 832 may also be located on a cover 842. The cover 842 may also be cylindrical or partially cylindrical in shape. The cover 842 may also have a diffusive coating for diffusing the light in various directions.

Referring now to FIG. 18, an alternate example to those of FIGS. 15-17 is illustrated. In this example, the light sources 820 are not located at the longitudinal axis 814 of the light assembly 810'. The light sources 820 may be suspended above the reflective surface 812 using supports or legs 846. The legs 846 may extend from the housing 834 or the reflective surface 812.

The reflective surface 812 may also be parabolic in cross-section or a parabolic cylinder in three dimensions. The parabolic cylinder 812 may have a focal line 850 that intersects the light sources 820. Thus, light emitted from the light sources 820 is directed toward the parabolic surface 812 and is collimated.

Various numbers of legs 846 may be used to suspend a light source. Each light source may be suspended or positioned by one or more legs 846. The light assembly 810' may also include a cover 842 as described above.

The light assembly 810' may also include a separate housing 834 and a separate parabolic surface 812. It should be noted that the light source suspended by legs illustrated in the light assembly 810' could also be used in the light assembly 810 illustrated in FIGS. 15, 16, and 17.

Although a light-shifting element 832 is illustrated in the light assembly 810 which extends across the light assembly, a light-shifting element may be formed on the inner surface 854 or the outer surface 856 of the cover 842. Most likely, the light-shifting surface will be on the inner surface 854 of the cover 852 in a commercial example.

Figure 19A:
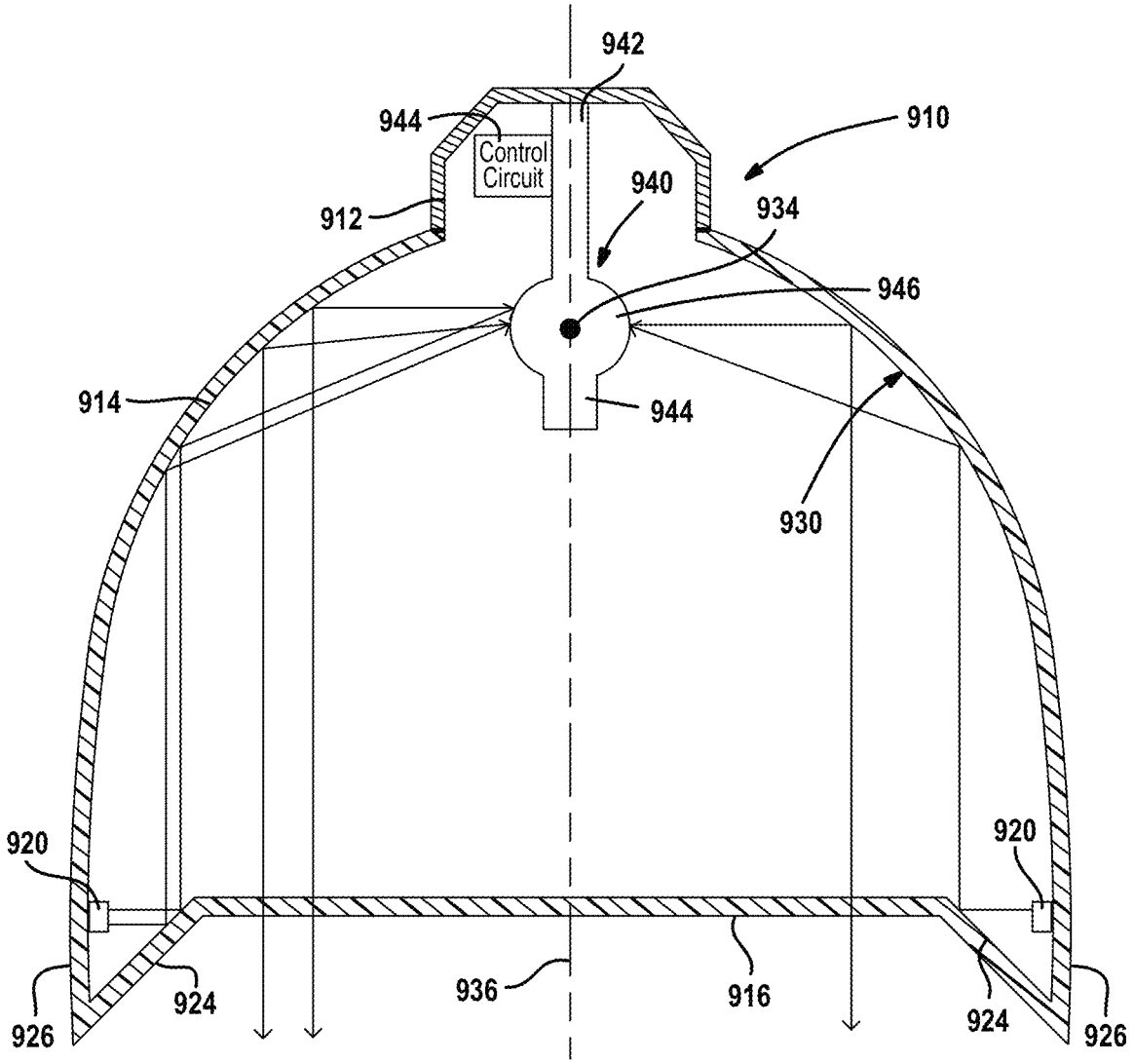
FIG. 19A is a cross-sectional view of a light assembly for use as a spotlight according to the present disclosure.

Referring now to FIG. 19A, another example of a light assembly 910 is illustrated. In this example, the light assembly is a spot light or down light. The light assembly 910 includes a base 912 and a housing 914. The base portion 912 may be screwed or clipped into an electrical receptacle. The housing 914 is used for reflecting light as will be described below. The light assembly 910 may also include a lens portion 916. The lens portion 916 may comprise light diffusers or a smooth surface. The lens portion 916 may have a film.

The housing 914 may have light sources 920 attached thereto. The light sources 920 may be spaced around the light assembly 910 in a position opposite to the base 912. The light sources 920 may generate various wavelengths of light including blue. All or some of the light sources may emit the same wavelength of light. In this example, each of the light sources 920 generates blue light.

The housing 914 may include an extension portion 926 for coupling the light sources 920 thereto. The extension 926 and the angular portion 924 may have a fixed relationship such as 45 degrees. The angle of the fixed relationship between the extension 926 and the angular portion 924 is fixed so that light is reflected as described below.

The housing portion 914 may be parabolic in shape. The construction of the housing 914 will be described further below. However, the interior of the light assembly 910 at the housing 914 may include a reflective surface 930. The reflective surface 930 has a focal point 934. The light sources 920 may generate collimated light or have light redirection elements that generate collimated light as will be illustrated in FIGS. 20 and 21. The collimated light is directed to the angular portion 924. When the collimated light and the angular portion 924 are at 45 degrees, the collimated light is reflected at an angle parallel to the longitudinal axis 936 of the light assembly 910. Light reflected in a direction parallel to the longitudinal axis 936 reflects from the reflective surface 930 toward the focal point 934.

A light-shifting element 940 is coupled within the light assembly 910. In this example, the light-shifting element 940 is fixedly coupled to the base 912. However, the light-shifting element may also be coupled to the housing 914. The light-shifting element 940 includes a first cylindrical portion 942, a second cylindrical portion 944, and a spheroidal portion 946. The first cylindrical portion 942 is adjacent to the base or housing 914. The spheroidal portion 946 has a center point that is coincident with the focal point 934. The longitudinal axis 936 is the longitudinal axis of the first cylindrical portion 942 and the second cylindrical portion 944 and intersects the center 934 of the spheroid 946. Some or most of the light-shifting element 940 may be covered with a light-shifting or energy-conversion material. For example, the light-shifting material may create white light from blue light. The collimated light that is redirected from the angular portion 924 reflects from the light-shifting element 940 and is also wavelength-shifted at the light-shifting element 940. The light reflected from the light-shifting element 940 is redirected to the reflective surface 930 of the housing 914 which redirects the light through the lens portion 916.

The angular portion 924 may be metallic or light non-transmissive. The angular portion 924 may also be a selectively reflective surface. Glass or plastic may be suitable wavelength selectively reflective surfaces. Different wavelengths of the light may reflect others and may pass therethrough. The wavelength selectively reflective surface may be formed by applying various types of materials. The angular portion 924 may be formed of a glass or plastic material that reflects the wavelength emitted by the light sources 920 while allowing wavelengths formed by the light-shifting element 940 to pass through. In the example above, the light sources 920 emitted light at a blue wavelength. The light-shifting element 940 converted the blue wavelength to white light which may be passed through the angular portion when leaving the light assembly 910.

Figure 19B:
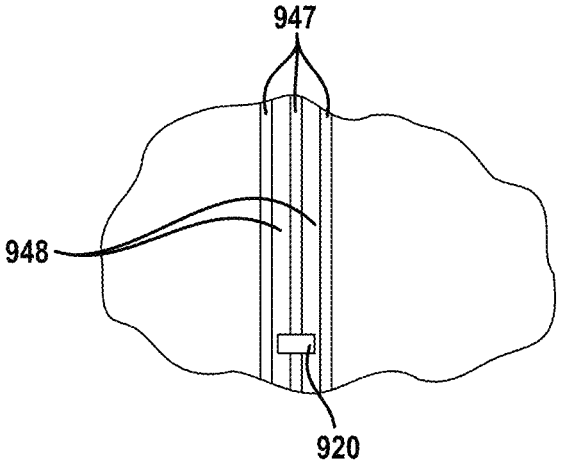
FIG. 19B is a partial view of the reflective surface of the reflector including circuit traces.

Referring now to FIG. 19B, one method for providing power to the light sources 920 is set forth. As mentioned above, the housing 914 may be made from a plastic material coated with an electrically conductive or electrically reflective material. If the material is both electrically conductive and reflective, the entire surface of the housing 914 may be coated with the material and portions may be removed to form gaps 947 therebetween. The gaps 947 may thus form traces 948 that may be powered by the control circuit 944 at different voltages to provide a voltage difference for operating the light source 920. A plurality of light sources 920 may be disposed around the circumference of the light assembly 910. Thus, a pair of conductors 948 may be provided for each light source 920. The size of the traces, in terms of width, may vary depending upon the various requirements. Preferably, the size of the gaps 947 is reduced so that reflective material removal is minimized. By minimizing the amount of reflective material removed, the reflector may have the greatest amount of reflectivity and thus an increased light output of the light assembly.

Figure 20:
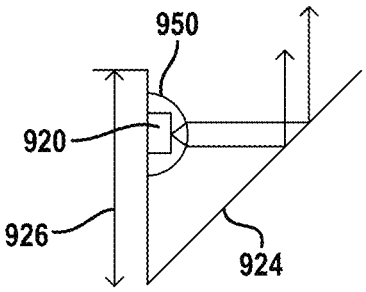
FIG. 20 is an enlarged portion of an extension portion and an angular portion as an alternative to that illustrated in FIG. 19.

Referring now to FIG. 20, an enlarged view of the extension portion 926 and angular portion 924 is illustrated. In this example, a lens 950 is used as a light redirection element. The lens 950 collimates light in a direction perpendicular to the longitudinal axis 936 of the light assembly 910 illustrated in FIG. 19. The light reflected from the angular portion 924 is reflected in a direction parallel to the longitudinal axis 936.

Figure 21:
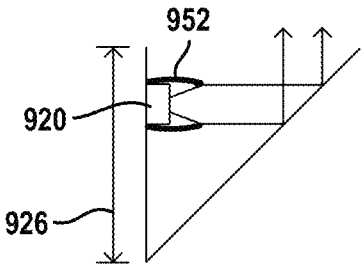
FIG. 21 is a cross-sectional view of the extension portion and angular portion having an alternative light redirection element.

Referring now to FIG. 21, the light redirection element adjacent to the light source 920 is illustrated as a reflector 952. The reflector 952 may be a parabolic or paraboloid shaped reflector that surrounds or nearly surrounds the light source 920. Light reflected from the parabolic reflector 952 is collimated in a direction perpendicular to the longitudinal axis 936. Light reflected by the angular portion 924 is perpendicular to the longitudinal axis 936.

Figure 22:
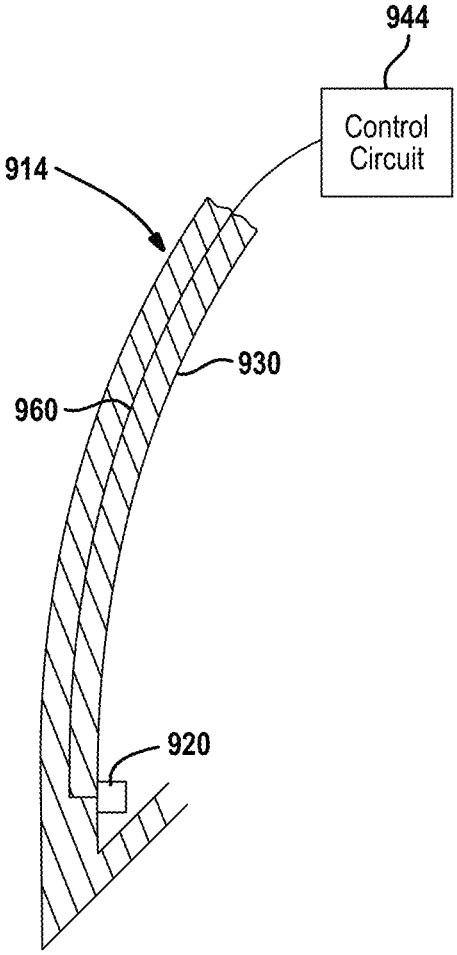
FIG. 22 is an enlarged cross-sectional view of a portion of the housing.

Referring now to FIG. 22, a portion of the housing 914 is illustrated. The housing 914 may be formed of various materials and have a circuit trace 960 therein. The circuit trace 960 may be embedded within the housing 914. That is, the housing 914 may be made of a plastic material and a circuit trace 960 may be embedded within the plastic material. The circuit trace 960 couples the control circuit 944 to the light sources 920. Two wires from the control circuit 944 to each of the light sources 920 may be embedded within the housing. Of course, other ways to provide power to the light sources may be used.

Figure 23:
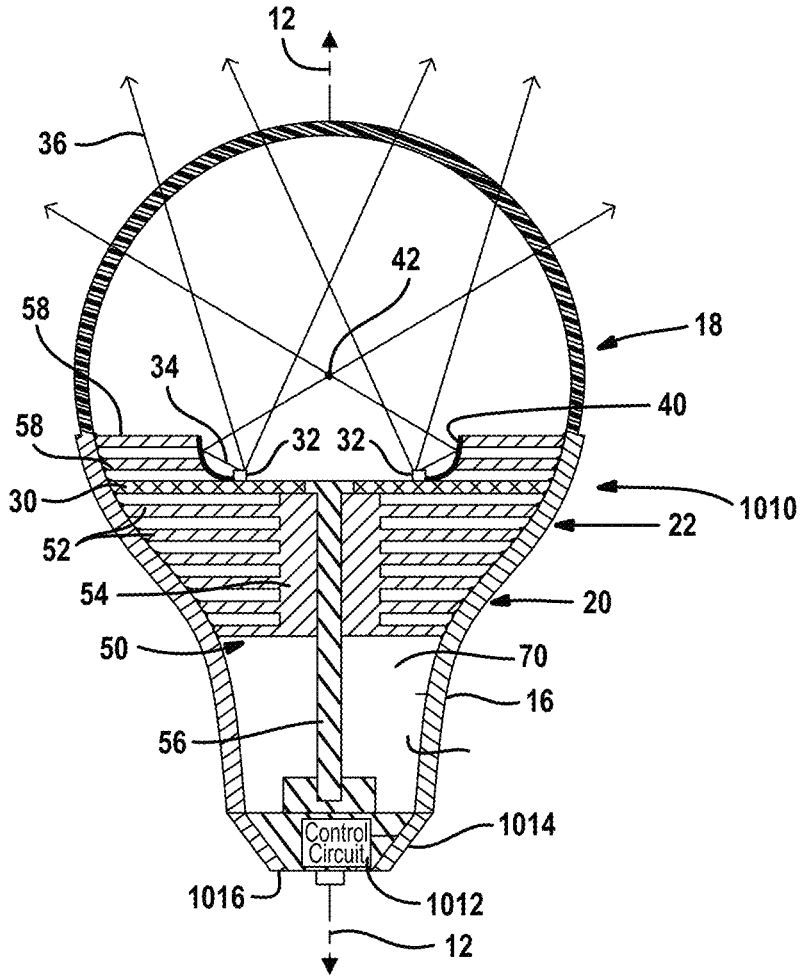
FIG. 23 is an alternative example of a light assembly having an alternative placement for a control circuit.

Referring now to FIG. 23, a light assembly 1010 having a control circuit 1012 is illustrated. The light assembly 1010 includes a lamp base 1014. The lamp base 1014 extends a predetermined distance from a bottom portion 1016 of the light assembly. The lamp base 1014 may be, for example, an Edison lamp base. The lamp base 1014 may include threads or other mechanical structures for affixing the lamp assembly 1010 within a socket (not illustrated). The lamp base 1014 defines a volume therein.

The control circuit 1012 may be disposed on one or more circuit boards that include drivers for driving the light sources. The control circuit 1012 may be coupled to the circuit board 30 having the light sources 32 in various manners including a direct wire or a wire within the housing of the light assembly 1010 or within the heat stake 56. The control circuit 1014 may also include alternating current to direct current circuit and other components.

The control circuit 1012 may be partially within the volume of the lamp base. The control circuit 1012 may also be disposed entirely within the volume defined within the lamp base 1014. The control circuit 1012 may also be epoxy encapsulated within the volume of the lamp base 1014.

It should be noted that, although a light assembly configuration similar to FIG. 1 is illustrated, the light configurations illustrated in the other figures may be incorporated therein. That is, a control circuit 1012 disposed within a lamp base volume may be incorporated into any of the examples above.

Figure 24:
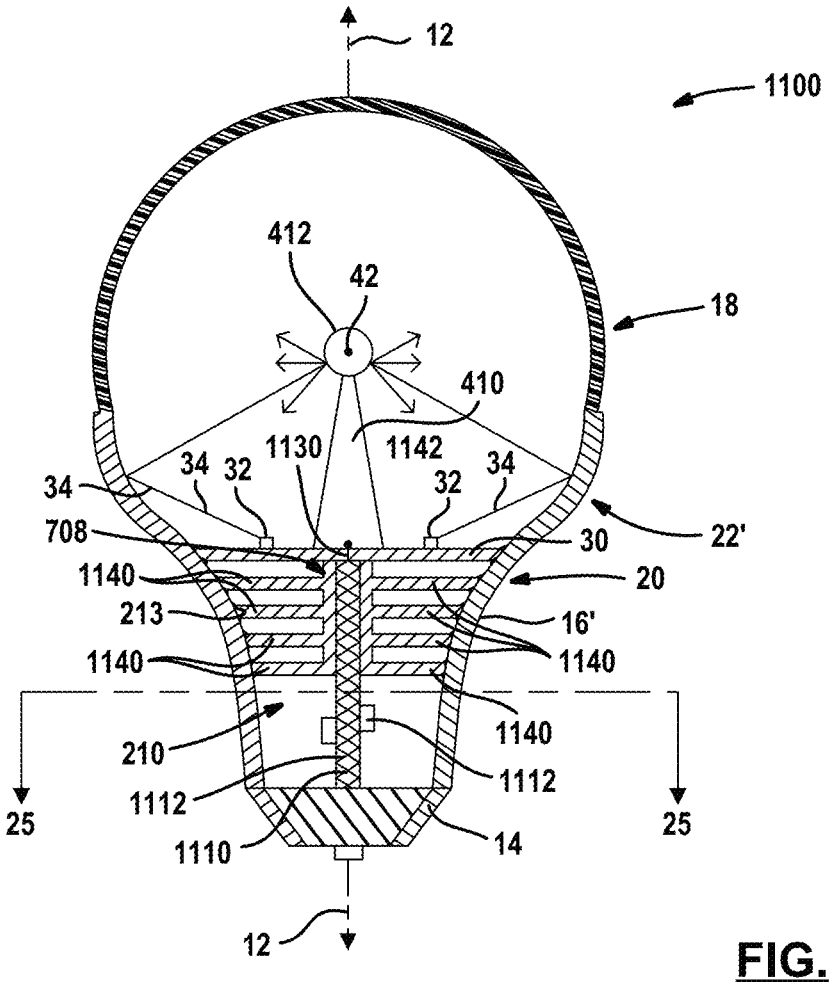
FIG. 24 is a side view of an alternative example of the light assembly that includes a rectangular circuit board mounted within the base.
Figure 25:
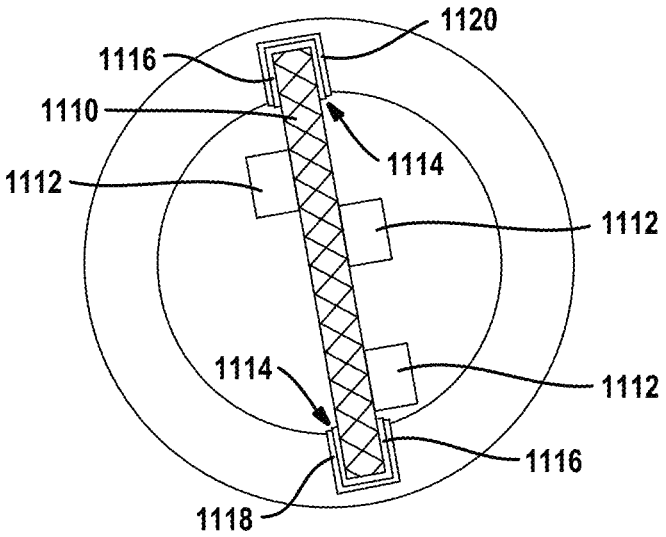
FIG. 25 is a cross-sectional view along line 2525 of FIG. 24 illustrating a portion of the circuit board within the base.
Figure 26:
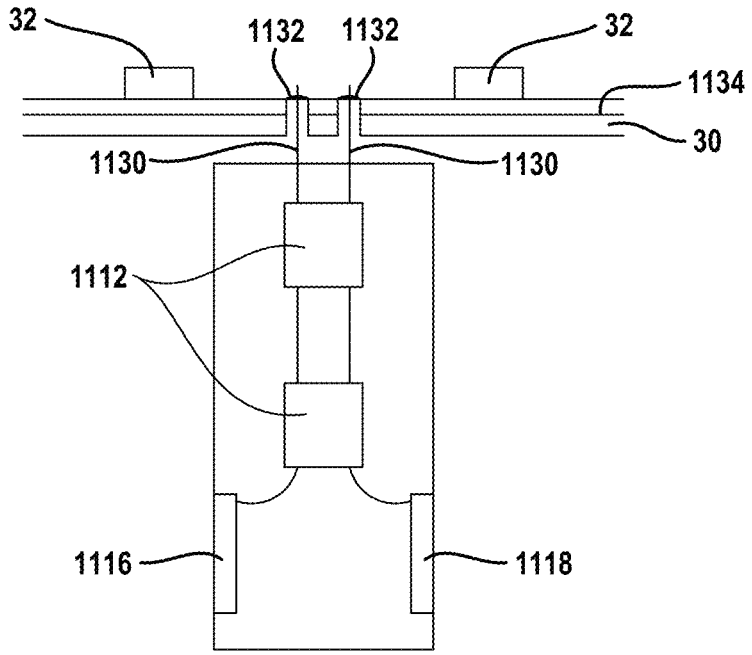
FIG. 26 is a plan view of a control circuit board in relation to a light source circuit board.

Referring now to FIGS. 24, 25 and 26, another example of a light assembly 1100 is illustrated. This example is similar to that illustrated in FIG. 13 above and thus common components will be labeled the same. In this example of the light assembly 1100, an alternative example of the control circuit board 1110 is illustrated. The control circuit board 1110 may include various electrical components forming the controls for the light assembly. The electrical components 1112 may be affixed to one or more sides of the circuit board 1110. The components 1112 may be various types of components as those described above, including an AC to DC converter, resistors, electrical chips, capacitors, and other elements.

As is best illustrated in FIG. 25, the circuit board 1110 may fit within the base 14. The fit may be an interference fit between the base 14 and the circuit board 1110. More specifically, a pair of grooves 1114 may be formed laterally across the base 14 from each other so that the circuit board 1110 may be accepted therein. As is best illustrated in FIG. 26, the circuit board 1112 may include edge connectors 1116, 1118 for electrically coupling to opposite polarities within the base 14. The interference fit within the grooves 1114 may be used to insure an electrical connection between the edge connectors 1116, 1118 and contacts 1120 disposed within the grooves 1114.

The base 14 may be a standard Edison base that, in combination with the other elements, forms a form function independent lighting source. That is, the base 14 and circuit board 1110 may be used with various light source configurations and optical arrangements.

As is best illustrated in FIG. 26, the circuit board 1110 may include wires 1130 extending therefrom. The wires 1130 may be used to provide power to the light sources 32 on the circuit board 30. Solder material 1132 may be used to join the wires 1130 to circuit traces 1134 disposed on the circuit board 30. In addition to solder 1132, other materials for joining the wires 1130 to the circuit traces 1134 may be evident to those skilled in the art. For example, conductive inks or adhesives may also be used. Wire bonding is another method for joining the wires 1130 to the circuit traces 1134.

The example illustrated in FIGS. 24-26 has a manufacturing advantage. The circuit base 14 may be formed and the circuit board may be populated. The circuit board 1110 may then be inserted into the grooves 1114 so that the contacts 1120 are electrically coupled to the edge connectors 1116 and 1118. Various configurations of electrical contacts may be used. What is important is that electricity is provided from the base 14 to the control circuit board 1110.

Heat-sink fins 1140 may have a center portion 1142 that joins the heat-sink fins 1140 together. The central portion 1142 may also extend upward to the circuit board 30 so that the circuit board 30 becomes or is also part of the heat sinking process. The heat sink 210 may be pre-manufactured by assembling the parts or molding the components integrally. The light sources 32 may be electrically joined to the circuit board 30 prior to insertion within the light assembly 1100. The assembly that consists of the circuit board 30 and the heat-sink fins 1140 may be placed upon the circuit board so that the wires 1130 extend through openings 1172 within the circuit board 30. The wires 1130 may then be electrically coupled to the traces 1134 on the circuit board 30. The cover 18 may then be placed over the light assembly and affixed to the housing 16'.

Figure 27:
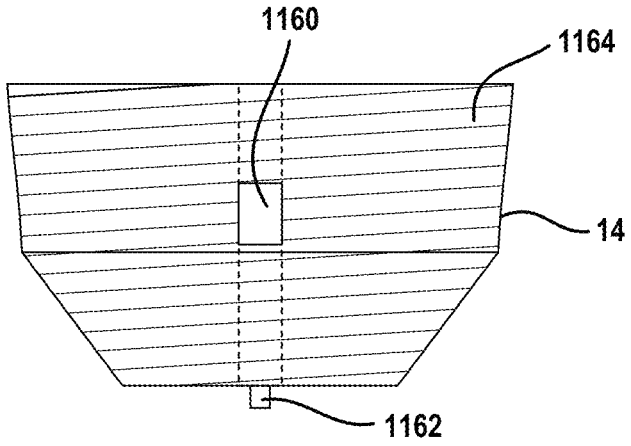
FIG. 27 is a side view of a lamp base formed according to the present disclosure.

Referring now to FIG. 27, an example of the base 14 is illustrated in further detail. The base 14 may include an electrical contact 1160 thereon. The contact 1160 provides sufficient electrical contact with the socket into which the bulb is placed. Another electrical contact (not shown) may be coupled to the bottom portion or bottom contact 1162. The electrical contact 1160 and the contact (not shown) in communication with the bottom portion 1162 may have opposite polarities in the AC circuit. The opposite polarities of the contacts 1160 and 1162 may provide power to the circuit board 1110. As illustrated, the base 14 may be a screw-in base having threads 1164. However, various types of bases may be used as described above. The contact 1160 is electrically connected to one of the contacts 1120. The wire or trace in electrical communication with contact 1162 is in communication with the opposite contact 1120.

Figure 28:
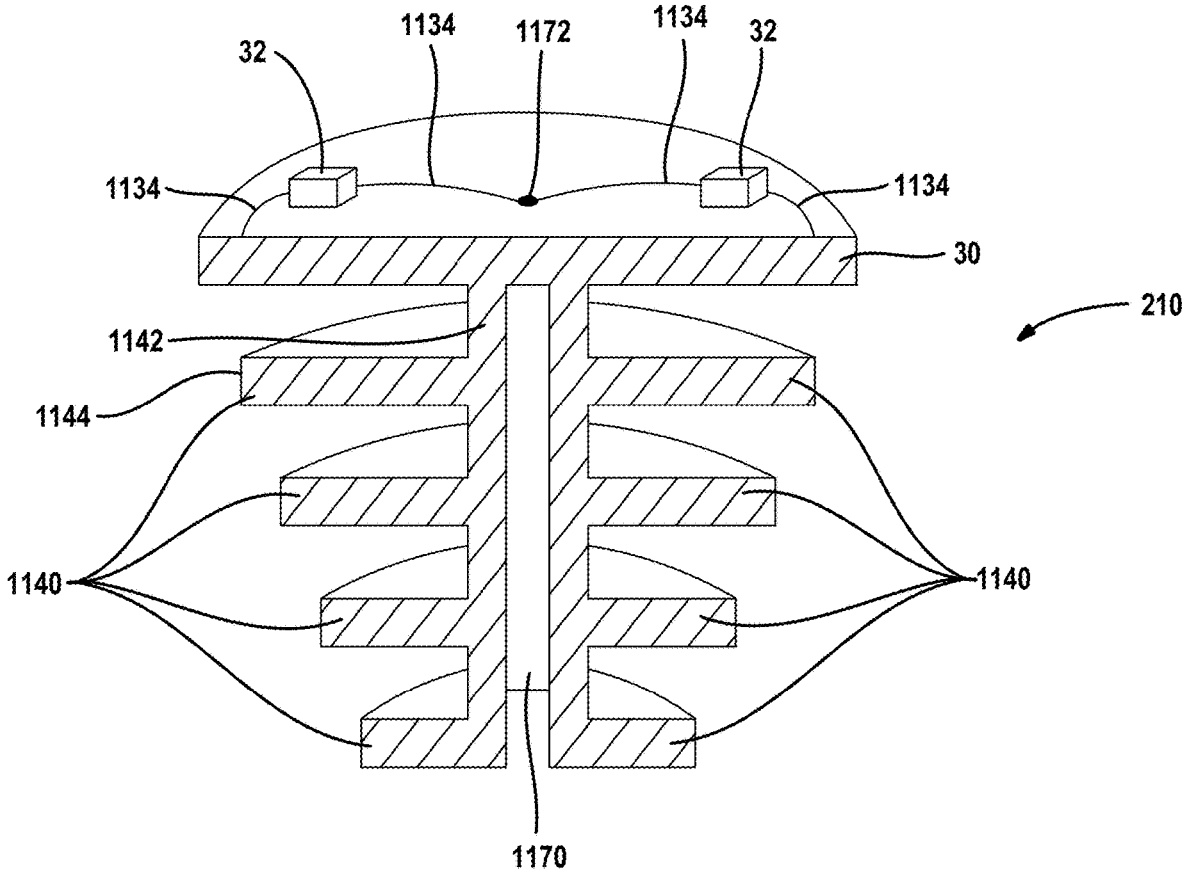
FIG. 28 is a cutaway cross-sectional view of a heat sink assembly of FIG. 24.

Referring now to FIG. 28, an example of a molded unit that includes the circuit board 30 being integrally formed with the heat sink 210 is illustrated. The heat sink includes fins 1140 along with the center portion 1142 as is illustrated. In this example, the circuit board 30 is formed from the same material as the heat-sink fins. The circuit traces 1134 are used to power the light sources 32. As mentioned below, the circuit board 30 may be a separate component or integrally molded with the heat-sink fins. An opening 1170 may be sized to receive the circuit board therein. An opening 1172 in the top of the circuit board 30 may be used to receive the wires 1130 from the circuit board 30. The circuit board 30 may be formed in the various manners described above in FIGS. 2A-2C with non-conductive portions and the circuit traces 1134 thereon. Because only half of the heat sink assembly is illustrated, another opening (not illustrated) may be provided for the wires 1130 having opposite polarity.

It should be noted that various components using the above examples may be interchangeable. For example, various light-shifting mechanisms may be used to change the wavelength of light from one wavelength to another wavelength. The various housing shapes and cover shapes may also be interchangeable. Likewise, various lamp bases may also be used. The control circuit may have many different types of examples for controlling the light-emitting diodes or other light sources. Various types and shapes of control circuits may be used in each of the examples. The heat sinks and light-emitting diodes may also have various configurations as described above. The heat sinks may be washer-like structures or may be an integrated structure as illustrated in FIG. 28. The heat sink may also be integrated with the light source circuit board 30 as illustrated in FIG. 28. The light source circuit board 30 may have various different examples including those illustrated in FIGS. 2A-2B. Such configurations may also be included within the heat sink configuration illustrated in FIG. 28. Other methods of performing heat dissipation, such as those illustrated in FIG. 3A using a heat stake and other examples using no heat stake, may be incorporated with various shapes of light assemblies. Also, the perforations 520 illustrated above may also be incorporated into any of the examples described above.

The foregoing description of the examples has been provided for purposes of illustration and description. It is not intended to be exhaustive or to limit the invention. Individual elements or features of a particular example are generally not limited to that particular example, but, where applicable, are interchangeable and can be used in a selected example, even if not specifically shown or described. The same may also be varied in many ways. Such variations are not to be regarded as a departure from the invention, and all such modifications are intended to be included within the scope of the invention.

What is claimed is:

1. A light assembly comprising:

an electrically conductive base defining a volume between a bottom portion and a side wall, said side wall comprising threads;

a housing coupled to the base;

a cover coupled to the housing;

a plurality of light sources coupled to and within the housing, said light sources generating light; and a control circuit disposed on a first circuit board electrically coupled to the light sources for driving the light sources, said first circuit board housed entirely within the volume defined within the base and adjacent to the threads, said circuit board comprising a first electrical contact disposed on an edge thereof;

said electrically conductive base comprising a second electrical contact disposed on the side wall forming a groove for receiving the first electrical contact with an interference fit.

2. A light assembly as recited in claim 1 wherein the control circuit is encapsulated within the base.

3. A light assembly as recited in claim 1 further comprising a second circuit board disposed within the housing therein, said second circuit board having the plurality of light sources thereon, said first circuit board electrically coupled to the second circuit board.

4. A light assembly as recited in claim 1 further comprising a heat sink thermally coupled to the plurality of light sources.

5. A light assembly as recited in claim 1 wherein the plurality of light sources are disposed in a ring around a longitudinal axis.

6. A light assembly as recited in claim 1 wherein the plurality of light sources are solid state light sources.

7. A light assembly as recited in claim 1 wherein the first circuit board is received within a pair of grooves formed within the electrically conductive base, wherein said pair of grooves are electrically coupled to an outside of the base, said pair of grooves coupling to a pair of edge contacts disposed on the first circuit board.

8. A light assembly as recited in claim 7 wherein the first circuit board is electrically coupled to a bottom contact of the base, wherein the pair of grooves have an opposite polarity to the bottom contact.

9. A light assembly as recited in claim 1 wherein the control circuit comprises a light source driver circuit.

*10. A light assembly comprising:*

*a cover;*

*a housing coupled to the cover;*

*a lamp base coupled to the cover, said lamp base being formed of thermally conductive polymer and metal contacts;*

*a first circuit board disposed within the housing, said first circuit board having a plurality of light sources thereon;*

*a heat sink thermally coupled to the light sources, said heat sink thermally coupled to the housing, said housing conducting heat away from the light sources;*

*said lamp base dissipating heat from the light sources; and*

*a control circuit electrically coupled to the light sources of the first circuit board and disposed within the housing, said control circuit having a plurality of electrical components thereon for controlling the light sources.*

*11. A light assembly as recited in claim 10 wherein the first circuit board communicates heat to the housing.*

*12. A light assembly as recited in claim 10 wherein the heat sink comprises a plurality of heat sink fins in thermal communication with the housing.*

*13. A light assembly as recited in claim 10 wherein the housing is thermally coupled to the lamp base.*

*14. A light assembly as recited in claim 10 wherein the control circuit is thermally coupled to a plurality of spaced-apart layers of the heat sink.*

* * * * *